(12) United States Patent
Shtivelman et al.

(10) Patent No.: US 7,558,383 B2
(45) Date of Patent: Jul. 7, 2009

(54) INITIAL ROUTING OF INTERNET-PROTOCOL NETWORK TELEPHONE CALLS

(75) Inventors: Yuri Shtivelman, Belmont, CA (US); Alec Miloslavsky, Hillsborough, CA (US); Oleg Bondarenko, San Francisco, CA (US); Igor Nevman, Palo Alto, CA (US); Douglas Gisby, Foster City, CA (US); Paul Cronin, Saratoga, CA (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 217 days.

(21) Appl. No.: 11/470,003

(22) Filed: Sep. 5, 2006

(65) Prior Publication Data

US 2007/0071224 A1 Mar. 29, 2007

Related U.S. Application Data

(60) Division of application No. 09/903,022, filed on Jul. 10, 2001, which is a continuation of application No. 08/948,530, filed on Oct. 9, 1997, now abandoned, which is a division of application No. 08/928,410, filed on Sep. 12, 1997, now Pat. No. 6,064,667, which is a continuation-in-part of application No. 08/866,357, filed on May 30, 1997, now Pat. No. 5,940,496, which is a continuation-in-part of application No. 08/802, 660, filed on Feb. 19, 1997, now Pat. No. 5,946,387, application No. 11/470,003, which is a continuation of application No. 09/659,933, filed on Sep. 12, 2000, now Pat. No. 6,337,904, and a continuation of application No. 09/592,182, filed on Jun. 12, 2000, now Pat. No. 6,259,692, and a continuation of application No. 09/574,315, filed on May 19, 2000, now Pat. No. 6,259,774, and a continuation of application No. 09/561,139, filed on Apr. 28, 2000, now Pat. No. 6,286, 033, and a continuation of application No. 09/096,729, filed on Jun. 11, 1998, now Pat. No. 6,263,066.

(51) Int. Cl.
*H04M 3/00* (2006.01)

(52) U.S. Cl. .............................. 379/265.12; 379/265.13
(58) Field of Classification Search ....................... None
See application file for complete search history.

(56) References Cited

U.S. PATENT DOCUMENTS 5,864,616 A * 1/1999 Hartmeier ............... 379/265.03

(Continued)

*Primary Examiner*—Creighton Smith

(57) ABSTRACT

A computerized telephony call center for serving a customer base has a central switch connected to a plurality of telephones at operator workstations and adapted to route calls to individual ones of the telephones, and also connected to a public switched telephone network, and a first processor connected to the central switch by a high-speed data link and to the telephone network by a digital network connection. The first processor is adapted to monitor transactional activity of the central switch, to process the activity information according to selected routines in the processor, and to communicate processed information to a second processor over the digital network connection. The digital network connection may be a TCP\P connection. In a preferred embodiment the first processor is connected by a local area network (LAN) to network interfaces including a video display unit (VDU) and input apparatus proximate individual ones of the plurality of telephones connected to the central switch. In some embodiments the LAN is also connected to a data server running an instance of a database. In other embodiments the call center, and other similar call centers are all part of a call routing system wherein calls are routed from Service Control Points to call centers over telephone lines, and data is routed to the call centers over a separate digital network connection between processors coupled to the Service Control Points and to the call center central switches. In various embodiments aspects of the invention apply to Internet protocol network telephony (IPNT) calls as well as to conventional telephony calls.

12 Claims, 15 Drawing Sheets

U.S. PATENT DOCUMENTS 5,946,387 A * 8/1999 Miloslavsky ........... 379/265.12
5,999,965 A * 12/1999 Kelly ........................ 709/202
6,046,762 A * 4/2000 Sonesh et al. ............ 348/14.11
6,058,435 A * 5/2000 Sassin et al. ................ 719/331
6,185,287 B1 * 2/2001 Miloslavsky ................ 379/219

* cited by examiner

Distribution and Implementation

INITIAL ROUTING OF INTERNET-PROTOCOL NETWORK TELEPHONE CALLS

CROSS-REFERENCE TO RELATED DOCUMENTS

The present patent application is a divisional application of copending application Ser. No. 09/903,022, filed Jul. 10, 2001, which is a Continuation application of copending patent application Ser. No. 08/948,530, filed Oct. 9, 1997, which is a divisional application of Ser. No. 08/928,410, filed Sep. 12, 1997 (now U.S. Pat. No. 6,064,667), which is a CIP of Ser. No. 08/866,357 filed on Feb. 10, 1997, which is a CIP of application Ser. No. 08/802,660. The present application is also a Continuation of applications having the Ser. No. 09/096,729 filed Jun. 11, 1998, Ser. No. 09/574,315 filed May 19, 2000, Ser. No. 09/592,182 filed Jun. 12, 2000, Ser. No. 09/659,933 filed Sep. 12, 2000, and Ser. No. 09/561,139 filed Apr. 28, 2000. The prior applications are all incorporated herein in their entirety by reference.

FIELD OF THE INVENTION

The present invention is in the area of telephone call processing and switching, and pertains more particularly to intelligent call-routing systems.

BACKGROUND OF THE INVENTION

Telephone call processing and switching systems are, at the time of the present patent application, relatively sophisticated, computerized systems, and development and introduction of new systems continues, including Internet-based telephony systems, which are known in the art as Internet Protocol Telephony (IPT) systems. It is also true that the older telephone call-switching networks, and the more recent Internet telephony systems are beginning to merge, and many believe will one day be completely merged.

Much information on the nature of such hardware and software is available in a number of publications accessible to the present inventors and to those with skill in the art in general. For this reason, much minute detail of known systems is not reproduced here, as to do so would obscure the facts of the invention.

One document which provides considerable information on intelligent networks is "ITU-T Recommendation Q.1219, Intelligent Network User's Guide for Capability Set 1", dated April, 1994. This document is incorporated herein by reference. There are similarly many documents and other sources of information describing and explaining IPT systems, and such information is generally available to those with skill in the art.

At the time of filing the present patent application there continues to be remarkable growth in telephone-based information systems, including IPT systems, wherein conventional telephone functions are provided by computer hardware and software. Recently emerging examples are telemarketing operations and technical support operations, among many others, which have grown apace with development and marketing of, for example, sophisticated computer equipment. More traditional are systems for serving customers of large insurance companies and the like. In some cases organizations develop and maintain their own telephony operations with purchased or leased equipment, and in many other cases, companies are outsourcing such operations to firms that specialize in such services.

A large technical support operation serves as a good example in this specification of the kind of applications of telephone equipment and functions to which the present inventions pertain and apply, and a technical support organization may be used from time to time in the current specification for example purposes. Such a technical support system, as well as other such systems, typically has a country-wide or even world-wide matrix of call centers for serving customer's needs. Such call center operations are more and more a common practice to provide redundancy and decentralization.

In a call center, a relatively large number of agents typically handle telephone communication with callers. Each agent is typically assigned to a telephone connected to a central switch, which is in turn connected to a public-switched telephone network (PSTN), well-known in the art. The central switch may be one of several types, such as Automatic Call Distributor (ACD), Private Branch Exchange (PBX), or PSTN. Each agent also typically has access to a computer platform having a video display unit (PC/VDU) which may be adapted, with suitable connectivity hardware, to process Internet protocol telephony calls.

At the time of the present patent application intelligent telephony networks and IP networks share infrastructure to some extent, and computer equipment added to telephony systems for computer-telephony integration (CTI) are also capable of Internet connection and interaction. There is therefore often no clear distinction as to what part of a network is conventional telephony, and what part is IPT.

In conventional telephony systems, such as publicly-switched telephony networks (PSTNs), there are computerized service control points (SCPs) that provide central routing intelligence (hence intelligent network). IPNs do not have a central router intelligence, such as a SCP. IPNs, however, have multiple Domain Name Servers (DNS), whose purpose is basically the same as the routers in intelligent networks, which is controlling the routing of traffic. Instead of telephony switches (PBXs), IP switches or IP routers are used.

An organization having one or more call centers for serving customers typically provides one or more telephone numbers to the public or to their customer base, or both, that may be used to reach the service. In the case of an IP network, a similar organization may provide an IP address for client access to services, and there are a number of ways the IP address may be provided. Such numbers or addresses may be published on product packaging, in advertisements, in user manuals, in computerized help files, and the like.

Routing of calls in intelligent networks, then, may be on several levels. Pre-routing may be done at SCPs and further routing may be accomplished at individual call centers. As described above a call center in an intelligent telephony system typically involves a central switch. The central switch is typically connected to a publicly-switched telephone network (PSTN), well-known in the art. Agents, trained (hopefully) to handle customer service, man telephones connected to the central switch. This arrangement is known in the art as Customer Premises Equipment (CPE).

If the call center consists of just a central switch and connected telephone stations, the routing that can be done is very limited. Switches, although increasingly computerized, are limited in the range of computer processes that may be performed. For this reason additional computer capability in the art has been added for such central switches by connecting computer processors adapted to run control routines and to access databases. The processes of incorporating computer enhancement to telephone switches is known in the art as Computer Telephony Integration (CTI), and the hardware used is referred to as CTI equipment.

In a CTI system telephone stations connected to the central switch may be equipped also with computer terminals, as described above, so agents manning such stations may have access to stored data as well as being linked to incoming callers by a telephone connection. Such stations may be interconnected in a network by any one of several known network protocols, with one or more servers also connected to the network one or more of which may also be connected to a processor providing CTI enhancement, also connected to the central switch of the call center. It is this processor that provides the CTI enhancement for the call center. Agents having access to a PC/VDU connected on a LAN to a CTI processor in turn connected to a telephony switch, may also have multi-media capability, including Internet connectivity, if the CTI processor or another server connected to the LAN provides control for Internet connectivity for stations on the LAN.

When a telephone call arrives at a call center, whether or not the call has been pre-processed at a SCP, typically at least the telephone number of the calling line is made available to the receiving switch at the call center by a telephone carrier. This service is available by most PSTNs as caller-ID information in one of several formats. If the call center is computer-enhanced (CTI) the phone number of the calling party may be used to access additional information from a database at a server on the network that connects the agent workstations. In this manner information pertinent to a call may be provided to an agent.

Referring now to the example proposed of a technical-service organization, a system of the sort described herein will handle a large volume of calls from people seeking technical information on installation of certain computer-oriented equipment, and the calls are handled by a finite number of trained agents, which may be distributed over a decentralized matrix of call centers, or at a single call center. In examples used herein illustrating various aspects of the present invention, the case of a decentralized system of multiple call centers will most often be used, although, in various embodiments the invention will also be applicable to individual call centers.

Even with present levels of CTI there are still problems in operating such call centers, or a system of such call centers. There are waiting queues with which to contend, for example, and long waits may be experienced by some callers, while other agents may be available who could handle callers stuck in queues. Other difficulties accrue, for example, when there are hardware or software degradations or failures or overloads in one or more parts of a system. Still other problems accrue due to known latency in conventional equipment. There are many other problems, and it is well recognized in the art, and by the general public who have accessed such call centers, that there is much room for improvement in the entire concept and operation of such call center systems. It is to these problems, pertaining to efficient, effective, timely, and cost-effective service to customers (users) of call center systems that aspects and embodiments of the present invention detailed below are directed.

Further to the above, IPNT systems at the time of the present patent application are much less sophisticated in provision of intelligent routing, parallel data transfer, supplemental data provision to agents, and the like. The advantages that embodiments of the invention described below bring to conventional telephony systems may also in most cases be provided to ITP systems and systems in which the form of the network between conventional telephony and IP protocol is blurred.

SUMMARY OF THE INVENTION

In a preferred embodiment of the present invention a computerized telephony call center for serving a customer base is provided, comprising a central switch connected to a plurality of telephones at operator workstations and adapted to route calls to individual ones of the telephones, and also connected by a first outside telephone line to a public switched telephone network; and a first processor connected to the central switch by a high-speed data link and to the telephone network by a digital network connection. The first processor is adapted to monitor transactional activity of the central switch, to process the activity information according to selected routines in the processor, and to communicate processed information to a second processor over the digital network connection.

In some embodiments the first processor communicates with the second processor over the digital network connection by TCP/IP protocol. Also in some embodiments the first processor is connected by a local area network (LAN) to network interfaces including a video display unit (VDU) and input apparatus proximate individual ones of the plurality of telephones connected to the central switch. A data server processor may be connected to the LAN as well, the data server processor running an instance of a database comprising data associated with customers.

In an alternative embodiment of the invention a telephony call-routing system is provided, comprising an initial call-processing system adapted for receiving calls from customers, and including a first processor adapted for routing incoming calls to selected destinations; a call center remote from the call-processing system, the call center comprising a telephony central switch connected to a plurality of telephones at operator workstations and adapted to route calls to individual ones of the telephones, and also connected to the initial call-processing system by a public switched telephone network; and a second processor connected to the telephony central switch by a data link and to the initial call processing system by a digital network connection. The second processor is adapted to monitor transactional activity of the telephony central switch, to process the activity information according to selected routines, and to communicate processed information to the first processor over the digital network connection, and wherein the first processor uses the processed information to select destinations to route the incoming In another alternative embodiment a call processing system adapted for routing incoming calls to selected destinations is provided, comprising a telephony central switch connected to a public switched telephone network; and a call-routing processor coupled to the telephony central switch and to a digital network data link, the call routing processor adapted for receiving and storing processed information about transactions at remote telephony switches. In this embodiment the call-routing processor is adapted to select destinations for routing incoming calls based on the stored processed information about transactions at remote telephony switches.

Several methods for practicing the invention in several aspects are provided as well.

In embodiments of the present invention improvements over conventional systems and methods are provided, not the least of which is a way to use systems comprising equipment from different manufacturers in ways that are machine independent. Further, methods are provided that reduce call-waiting time in such systems, that improve efficiency, and that provide services at an improved cost efficiency compared to prior art systems.

In another aspect of the invention a call rerouting system is provided, comprising a first call center and a second call center; a rerouter connected to the first call center and to the second call center by digital network link; and a pool of unique destination numbers assigned to the second call center. The rerouter sends rerouted calls from the first call center to the destination numbers in the second call center in a sequential manner such that any destination number in the pool for the second call center, once used, is not used again until all of the remaining destination numbers in the pool are used once each.

There may also be multiple call centers, and a unique pool of destination numbers is assigned to each call center. Calls are rerouted from each call center to the others, and the rerouter sends rerouted calls from the any call center to another by using the destination numbers in a receiving call center in a sequential manner such that any destination number in the pool for any call center, once used, is not used again until all of the remaining destination numbers in the pool are used once each.

In various embodiments of the invention, by using the sequential method, the number of destination numbers required to be assigned to each call center for the purpose of directing rerouted calls is minimized.

BRIEF DESCRIPTION OF THE DRAWING FIGURES

DESCRIPTION OF THE PREFERRED EMBODIMENTS

General Description

Figure 1:
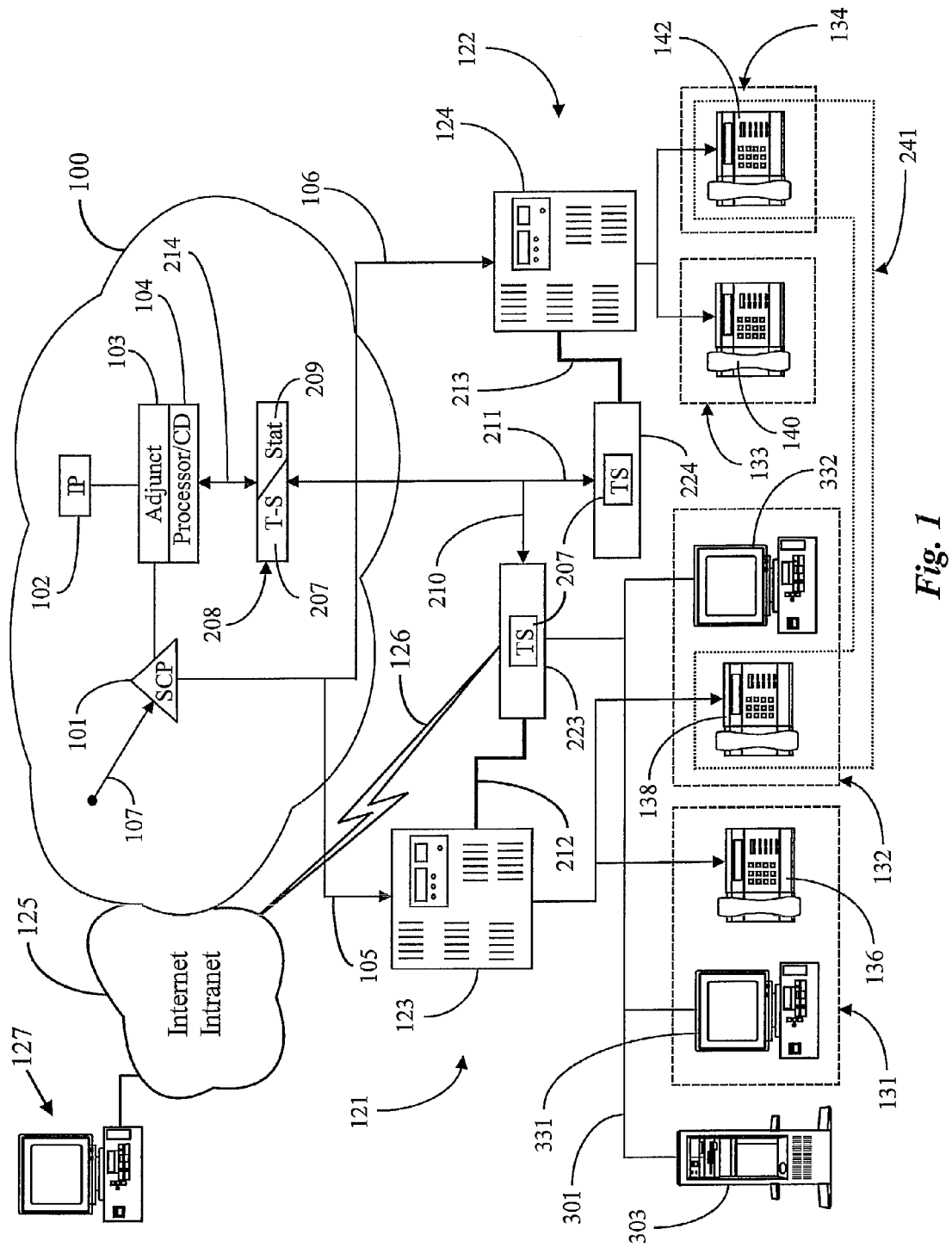
FIG. 1 is a system diagram of a call-routing system according to a preferred embodiment of the present invention.

FIG. 1 is a system diagram of a call-routing system according to a preferred embodiment of the present invention, comprising two call centers 121 and 122. In this embodiment there may be many more than the two call centers shown, but two is considered by the inventors to be sufficient to illustrate embodiments of the invention. Each of call centers 121 and 122 includes a telephony switch (switch 123 for center 121 and switch 124 for center 122) providing routing to individual agent stations.

Call centers 121 and 122 in FIG. 1 are CTI-enhanced by virtue of a processor connected by a high-speed data link to the associated call center switch. At call center 121, processor 223 is connected by link 212 to switch 123, and at call center 122, processor 224 is connected to switch 124 by link 213. Each processor 223 and 224 includes an instance of a CTI application 207 known to the inventors as T-Server (T-S) 207. Further, each processor 223 and 224 at each call center is in turn connected to a local area network (LAN). For example LAN 301 is shown connected to processor 223 in FIG. 1. No equivalent network is shown at call center 122 for the sake of simplicity, although the architecture described herein for call center 121 may be presumed to be extant at call center 122 and other call centers as well.

Each call-in center 121 and 122 included in this example also includes at least two telephone-equipped agent workstations, which also each have a user interface (IF) to the associated LAN. Workstation 131 at center 121 for example has a telephone 136 connected to central switch 123, and a proximate user interface 331 to network 301. Interface 331 may be a PC, a network terminal, or other system, and typically provides a video display unit (VDU) and input apparatus (keyboard/pointer for example) allowing an agent to view data and make appropriate inputs. For descriptive purposes the computer workstation at each agent station will be termed a PC/VDU.

In like manner workstation 132 illustrated has a telephone 138 connected to central switch 123 and a proximate PC/VDU 332 providing an agent with display and input capability. For call enter 122 workstations 133 and 134 are shown having respectively telephones 140 and 142 connected to central switch 124, in turn connected to processor 224 by link 213. A local area network (LAN) equivalent to LAN 301 at call center 121 is not shown for call center 122 for the sake of simplicity in illustration, and PC/VDUs for the agents are similarly not shown for call center 122.

As is true with LANs in general, servers of various sorts may be connected to LAN 301 at call center 121. In FIG. 1 a data server 303, in this instance including a customer database is shown connected to LAN 301. A similar database server may also be connected to a LAN at call center 122. The customer database will typically comprise such as the names, addresses, and other information relating to customers for whom the call center is established, and also in many instances resource information for agents to access in helping callers with their problems.

In some embodiments of the present invention to be described in enabling detail below, agents at agent stations interact verbally with clients via the telephones at the workstations, and the PC/VDUs are utilized for such as screen pops with information about clients, scripts for agents to follow in aiding clients, and technical information and other data needed in interacting with clients. In other embodiments the PC/VDU equipment may be used more comprehensively, such as for video-conferencing with clients, receiving, storing and responding to electronic documents such as e-mail, and for Internet protocol telephony (IPT). In the case of Internet-based and related services, the CTI processor, or any other processor connected to the LAN at a call center may be Internet-connected, and provided with the necessary hardware and software known in the art for providing Internet access to agent's PC/VDUs also connected on the LAN at the call center.

Because of differences in conventional telephony service (CTS) and Internet telephony, and because the overt mechanism in both systems is modeled on the perceived, traditional model of telephone calls, a convention is necessary to distinguish. In the descriptions that follow, for this reason, CTS is referred to as intelligent network telephony (INT) and Internet telephony is referred to as Internet protocol network telephony (IPNT). This is not intended to imply that all CTS systems described herein are prior art, or that all IPNT systems described are inventive and unique. These distinctions will be made below as much as possible in every case described.

The main difference between CTS and IPNT is in the residence of network intelligence. In INT the firmware generating intelligence is mainly residing in network processors, where in IPNT, the firmware for the intelligence mostly resides in the end-equipment, whereas the network is often referred to as dumb network. Since most of the features of present inventions reside in the CTI server, known to the inventors as T-Server, and from there control certain network functions in certain ways, it is mostly irrelevant to their application, where the actual intelligence resides.

One of the variables in routing incoming calls, whether in INT or IPNT, is the skill set of each agent assigned to a workstation. This skill set may include a unique set of skills, resources and knowledge, such as, but not limited to, language capability, access to technical information, and specific training. In routing calls in a conventional system both at the network and at the call center level, the system and/or network needs to know such things as the status of any or all call centers, the availability of each agent, the skill set of each agent, the number of incoming calls, the number of calls waiting to be answered, and so forth. In a system using Internet protocol telephony for access to agents at call centers the same kinds of information needs to be available, and there needs to be also a way to route IPNT calls based on the information.

Referring again to FIG. 1, and specifically to call center 121, there are a number of ways that PC/VDUs 331 and 332 may have access to the Internet, and thereby to IPNT calls as well as to data services and the like provided at the call center. For example, any one of PC/VDUs at the call center, or other call center such as center 122, may have a modem connected to a phone line and software to connect to an Internet service provider. More likely, considering only call center 121. Processor 223 or another processor or IP router connected to LAN 301 may have Internet access and provide access to stations on the LAN. In specific aspects of the invention described below, Internet access and IPNT telephony relative to the inventive concepts are discussed in more detail.

In this example, control routines executable on processor 223 for call center 123 may access algorithms providing call routing at the call center level, and may also access data from data server 303 for use in routing decisions and the like. Similar routines run on processor 224 serving call center 122. In specific aspects of the invention described below, routing of IPNT calls will be discussed as well.

Telephone calls are routed to call centers 121 and 122 over conventional telephony lines 105 and 106 respectively from remote origination points (a customer seeking technical aid has placed a call, for example, to an advertised or otherwise provided 1-800 number). Cloud 100 represents the intelligent telephone network system, and is referred to herein as a network cloud. This may be, for example purposes, a regional portion of the world-wide network, or may represent the entire world-wide network of connected telephone equipment. All conventional telephone calls routed to call-in centers 121 and 122 originate somewhere in network cloud 100.

In addition to conventional telephone calls, there may be IPNT calls originating from computer platforms represented here by platform 127, placed to the call centers through the Internet, an Intranet, or other data network, represented by cloud 125, over a link such as link 126 shown connecting to processor 223. It will be apparent to the skilled artisan that there are a number of alternative ways Internet and other data network access may be provided to stations at call centers. For descriptive purposes following descriptions will refer to cloud 125 as the Internet cloud, although it should be understood that this is exemplary, and there may be other data networks involved.

In this example an incoming conventional telephone call to be routed to a call center is represented by vector 107 into a Service Control Point (SCP) 101. In some embodiments of the invention calls may go directly to one of the call centers illustrated, but in most embodiments an SCP is accessed first, and network-level routing may be done, wherein incoming calls may be routed based on information available to the SCP.

SCP 101 typically comprises a telephony switch somewhat more local to the calling party than the switches at call centers 121 and 122 illustrated. SCP 101 is coupled in this example to an adjunct processor 103 associated with a call-distribution processor 104. Call distribution processor 104 has call statistics describing call distribution between call-in centers 121 and 122 (typically over a larger number of call-in centers than two).

An Intelligent Peripheral 102 is provided in this example coupled to SCP 101, and its function is to provide initial processing of incoming calls. This initial processing may be done by voice recognition, eliciting information from a caller such as type of product and model number, language preference for communication with an agent, and much more, depending on the nature of the service provided by the organization providing the call centers.

A processor 208 including an instance of telephony server T-S 207, also including an instance of a statistical server (Stat Server) 209 is coupled by two-way data link 214 to the other parts of the system at the initial call processing and routing system associated with SCP 101. It will be apparent to those with skill in the art that the functions of CD Processor 104, Adjunct Processor 103, IP 102, T-S 207 and Stat Server 209 may be accomplished in a variety of ways in hardware and software mix. There may be, for example, a single hardware computer coupled to central switch 101, and the various servers may be software implementations running on the one hardware system. There may be as well, more than one hardware system, or more than one CPU providing the various servers.

In this embodiment, as described above, conventional calls incoming to SCP 101 are routed to call centers 121 and 122 via PSTN lines 105 and 106. The convergence of lines 105 and 106 to SCP 101 and divergence to call centers 121 and 122 is simply to illustrate that there may be considerable switching activity between these points. Processor 208 connects to processor 223 and to processor 224 by digital data links 210 and 211. Again the convergence is just to illustrate the network nature of these links, which may connect to many SCPs and to many call centers as well. In a preferred embodiment the network protocol is TCP/IP, which is a collection of data protocols which are not discussed in detail here, as these protocols are in use and very well-known in the art. There are other protocols that might be used, new protocols may be developed to provide better and faster communication, and other methods may be used to speed up communication. For example, Urgent Dispatch Protocol (UDP) may be used in some instances, which, for example, allows data packets to bypass routing queues.

Although not explicitly shown in FIG. 1, processors at the SCP shown may have Internet access into cloud 125, so IPNT calls may be directed to computer equipment at the SCP, and, as will be described further below, processes at the SCP may apply to IPNT calls as well as to conventional calls.

Processor 208 running an instance of T-S 207 as described above may control routing of calls, both conventional and IPNT at the network level, that is, calls received at SCP 101, in the same manner that processor 223 may control routing at central switch 123. In the case of routing of IPNT calls by the processes of an intelligent network router, the inventors are not aware of such intelligent routing in the art for IPNT calls, and this functionality is considered by the inventors unique.

It is emphasized again that not all embodiments of the present invention require all of the elements and connectivity shown in FIG. 1, although some embodiments will use all of the elements and connectivity shown. Also, functionality in various embodiments of the invention described in enabling detail below will differ not in hardware and connectivity in all cases, but in application and execution of unique control routines in many cases.

Uniform Control of Mixed Platforms in Telephony (3208)

In a preferred embodiment of the present invention unique control routines are provided for execution on such as processor 223, processor 224 and processor 208, providing communication ability thereby between call centers such as centers 121 and 122, and between call centers and initial call processing centers such as that represented by SCP 101.

Figure 2A:
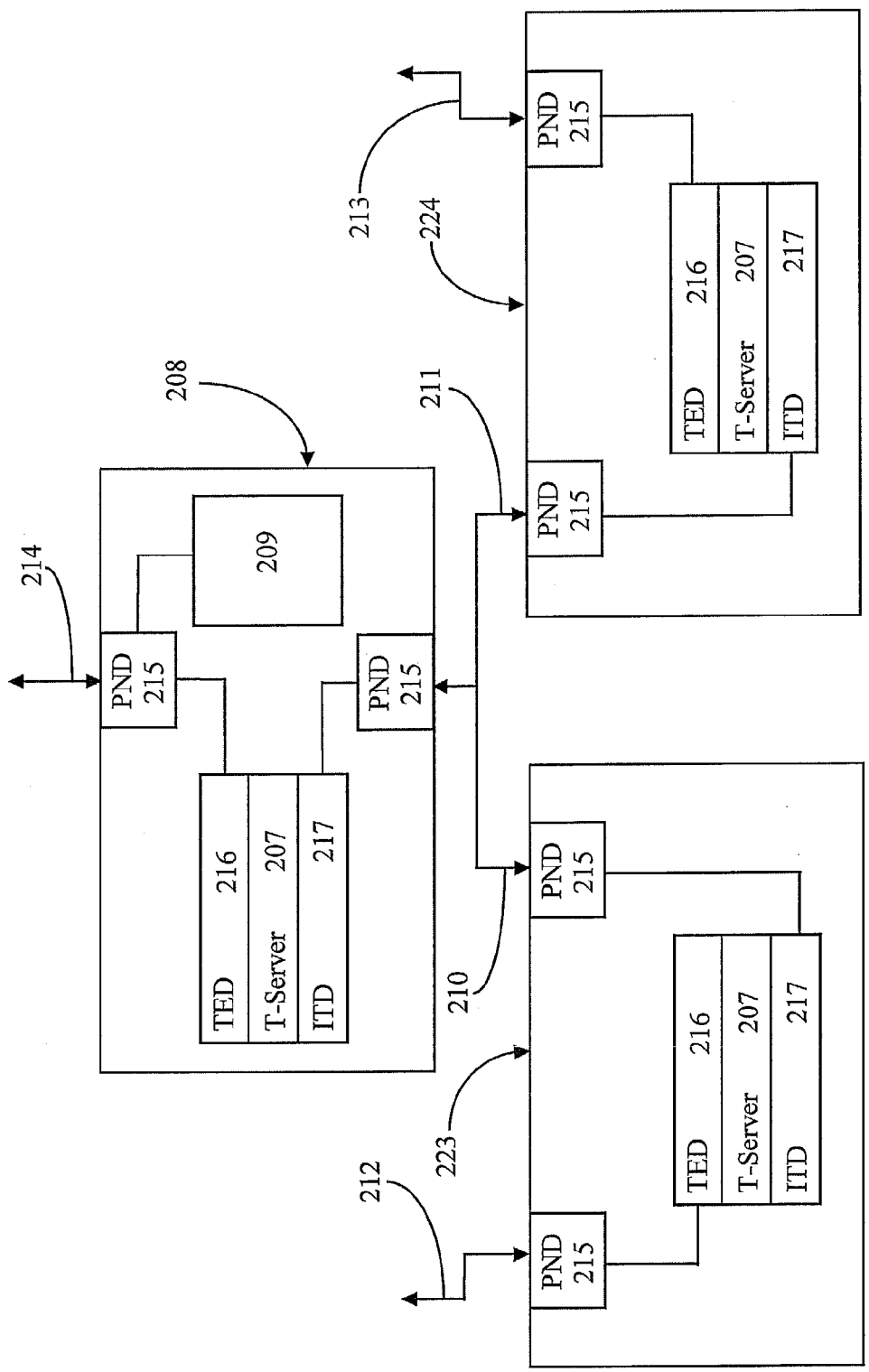
FIG. 2A is a block diagram representing communication functionality between equipment groups in embodiments of the present invention.

FIG. 2A is a block diagram representing a unique communication capability provided in a preferred embodiment of the present invention. There are, as described above in the Background section and known in the art, several different kinds and manufactures of call switching equipment. Each central switch uses a proprietary communication protocol for CTI applications. In CTI enhancement as known in the art, individual manufacturers provide processors connecting to their own switches and using the communication protocols proprietary to those switches. The computer enhancements, then, can serve a single manufacturer's switches, and provide communication between those switches. If a user, however, has multiple call center sites, for example, having equipment from different manufacturers, a difficult situation arises. If that user decides on a computer enhancement, depending on which manufacturer provides the enhancement, the equipment at the other site may quickly become obsolete. To communicate with the other site, it may be necessary to purchase all new equipment for the other site to be compatible with the computer-enhanced site.

Processors 223, 224, and 208 are shown in FIG. 2A connected by links 210 and 211 as in FIG. 1, with additional detail of both software and hardware illustrated in a particular exemplary embodiment. In each processor there is an instance of T-S 207 executable. To communicate with other devices each processor must have one or more ports configured to accomplish the communication. The implementation of such ports is represented in FIG. 2A by the representation PND 215. PND 215 in each instance is a physical network adapter for the network to which it is intended to connect, such as microwave, optical, coaxial, ring-network, and the like, as well as the software drivers required to control those adapters.

Layered to each instance of T-Server 207 in each processor is a control routine for handling data communication with either an instance of telephony equipment (switch 123 for example) or another T-server. Hence, in FIG. 2A, each instance of T-server 207 is layered with a Telephony Equipment Driver (TED) on one side, and an Inter T-Server Driver (ITD) on the other side. Connectivity of an ITD or a TED to a PND is based on the external connection intended at the PND. For example processor 223 is connected on one side to switch 123 by link 212, so TED 216 in the instance of processor 223 will be configured to drive communication with switch 223 (according to the make and manufacture of that switch). On the other side processor 223 is connected via link 210 to processors running other instances of T-server 207. Therefore ITD 217 connects to PND 215 at link 210.

Although not shown explicitly in FIG. 2A, which follows the architecture of FIG. 1, it will be apparent to those with skill that a processor may also be configured with an instance of TED on each side of a instance of T-Server 207, providing thereby a processor capable of interconnecting two central switches of different type, make, or manufacture directly. In this manner processors may be adapted to interconnect central switches of various manufacturers and processors running instances of T-Server 207, and, by providing the correct PNDs, the processors thus configured may be adapted to communicate over any known type of data network connection.

In the matter of Internet protocol telephony, in the general description provided above with reference to FIG. 1, it was described that Internet access may be made by processors at either call centers or SCPs in the conventional network, and that functions provided for conventional telephony may also be applied to IPNT calls. With regard to FIG. 2A, IPNT calls received at any processor associated with SCP 101 may be routed through processor 208 and via links 210 and 211 to processors 223 and 224, where such IPNT data may be provided to agent's stations at associated call centers. In this process, IP addresses may be altered and substituted, as a way of routing the IPNT data. For example, an IPNT call may be directed to processor 208 by one IP address, and the IPNT call may be found to be from a particular client of the organization to which the call centers are dedicated. A routing decision may be made at the SCP such as in processor 208 as to the call center best adapted to deal with the client, and the IP address for a processor at the call center may be substituted.

In this manner, according to embodiments of the present invention, a system is provided for the first time that allows radically different telephony systems to be joined in high-functionality integrated intelligent networks.

Escalatory Reactive Call Routing (3207)

Figure 2B:
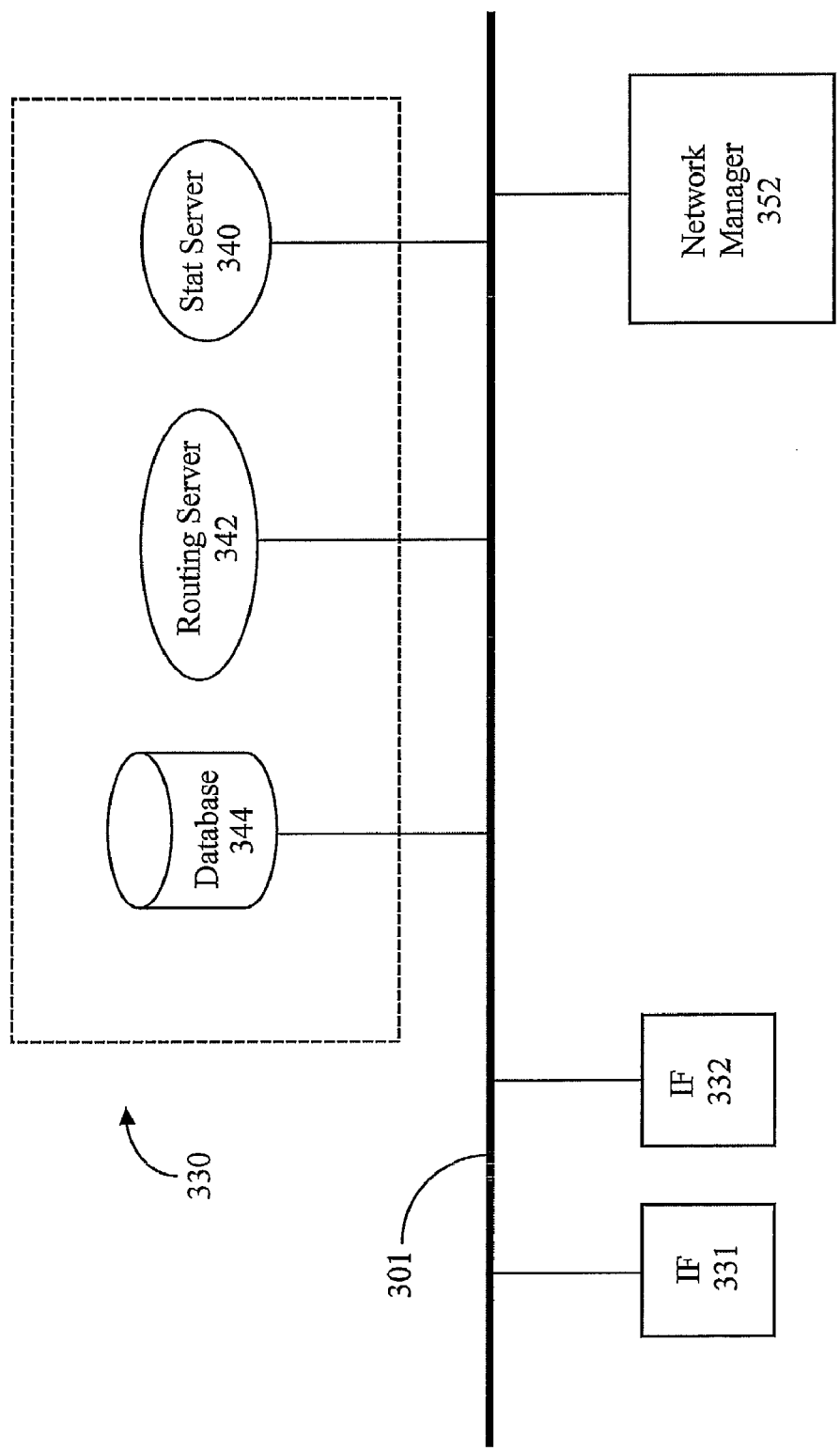
FIG. 2B is a block diagram illustrating a unique call center-level routing system in an embodiment of the present invention.

FIG. 2B is a block diagram depicting a unique escalatory reactive routing system 330 according to a preferred embodiment of the present invention, which may be implemented on a call center or at the network level, such as in call center 121 or such as in network cloud 100 of FIG. 1. In this routing system, as implemented at the call center level, processor 223 (FIG. 1) is notified when a call is received, and sends information about the call to a routing server 342. Routing server 342 is typically implemented as a part of T-server 207, which routes a call to an agent best qualified to answer the call based on predetermined criteria. The T-server having the routing server need not necessarily be implemented on processor 207 as shown in FIG. 1, but could be resident elsewhere in the networked system. Routing server 342 typically directs switch 123 to route the incoming call to the designated agent.

Database 344 in FIG. 2B is a customer database typically maintained on such as data file server 303 (FIG. 1). Routing server 342 comprises control routines which may be executed on processor 223 (FIG. 1) or there may be a separate processor on network 301 executing the router. A stat server 140 is adapted to track and provide statistical data concerning calls made, completed and the like, and to maintain data on agents skill profiles and agent's activities, and to generate reports. Again, stat server 140 may execute on processor 223, or on another processor connected to network 301. Finally, a network manager 352 is also connected on the network, and is adapted to the task of managing aspects of LAN 301.

Routing in this embodiment is typically based on (i) the skills set of the agent (ii) information relating to the calling party, (iii) activities of the call center, and (iiii) legal or other authorization held by an agent. Examples of the skills set of the agent are language, product knowledge, and the like. Examples of calling party information are products purchased, geographical location and the like. Examples of call center activities are number of available agents, calls previously handles by an agent, and the like.

At the same time an incoming call is directed to a particular agent, data retrieved from database 344 is directed on LAN 301 to the proximate video display unit (VDU) at the workstation assigned to that agent. The agent is then enabled to deal with the call in the best possible manner.

It is apparent to the present inventors that the expeditious functioning of routing system 330 is highly dependent on the expeditious functioning of the various elements of the overall system, including, but not limited to software and hardware elements. These elements include the functions of all of the elements shown in FIG. 1, specifically including all of the communication links, both telephony and digital. If for example, stat server 340 or database 344 experiences a sudden degradation in service, the routing server is going to be delayed as well. As another example, there may be an unexpectedly large number of accesses to database 344 in a short time, overloading a search engine associated with the database, and this circumstance could degrade overall performance in routing. As a further example a partial or total loss of a communication link, such as digital network link 210, will severely degrade overall system performance.

By virtue of network connection and interconnection, network manager 352 is enabled to track and monitor performance and function of all system elements, and to report to database 344 and to routing server 342, and the routing server also has access to other data and statistics via stat server 340 and database 344. Routing server 342 also has access in this embodiment to multiple routing algorithms which may be stored at any one of several places in the overall system. An object of the invention in the instant embodiment is to provide for executing different routing algorithms based on system performance as reported by network manager 352 and in accordance with data available from database 344, stat server 340, and received via digital network link 210 as described in further detail below. Database 340, routing server 342, and stat server 340 communicate through layered protocol as known in the art, including but not limited to layers for network-dependent protocol, Internet protocol (IP), User Datagram Protocol (UDP), Simple Network Management Protocol (SNMP), and manager process.

In a preferred embodiment, routing server 342 selects a routing algorithm to be executed based on degradation in performance of part of the call center or components, either hardware or software, in an escalatory manner. The more the system degrades, the more the router reverts to emergency measures. The selected algorithm preferably reduces or eliminates access to or use of the component or resource adduced to be degrading in performance.

It will be apparent to those with skill in the art that the invention described with reference to FIGS. 2A and 2B is not limited to monitoring only system and component faults. It has broader application. For example, algorithms may be stored for operating according to load level. Other algorithms may be selected according to specific times-of-day, and such algorithms may be selected based on the time window in a 24-hour period. As another example, algorithms may be stored and selectable based on days of the week. Still other algorithms might be prepared to be accessed with introduction of new products and the like. Statistics may be tracked relative to the percentage of agents free, for example, and a routing algorithm may be accessed for the situation wherein 90% of agents are busy, routing calls only to the next free agent rather than following a skill-based routing algorithm. The invention in this embodiment allows routing algorithms to be selected and executed based upon a very broad congruence of circumstances, so that a call center may be operated at best efficiency even as circumstances alter rapidly, including circumstances of hardware and software functionality, as described in specific embodiments above.

In other embodiments of the instant invention escalatory reactive call routing may be implemented at the network level, with a router implemented as a portion of T-S 207 running on processor 208. In this case stored routing algorithms may be selected and implemented in conjunction with functionality of network level components, both hardware and software, and in accordance with call loading into SCP 101.

In the matter of Internet protocol telephony, IPNT calls received anywhere in the system can be redirected (routed) by the intelligence provided and described relative to conventional telephony, and such calls, once received and redirected, may be conducted to final agent destinations either through the connectivity of the calls centers and the intelligent network, or redirected by new IP address back into the Internet (or Intranet) and thence to agents equipment by direct connection.

Agent Level Call Routing in Telephony Systems (3200)

Referring now back to FIG. 1, associated with SCP 101 in embodiments of the present invention, there is a processor 208 comprising an instance of a Stats-server 209 and an instance of T-Server 207, which processor communicates with other components via two-way data link 214. Communication in this embodiment is as illustrated in FIG. 2A and described in disclosure above relative to FIG. 2A.

In description above reference was made to TCP/IP communication on links 210 and 211, and that this protocol is merely exemplary. There are other protocols that might be used, new protocols may be developed to provide better and faster communication, and other methods may be used to speed up communication. For example, User Datagram Protocol (UDP) may be used in some instances, which, for example, allows data packets to bypass routing queues.

In conventional systems known to the present inventors, routing at the network level, that is, in the network cloud 100 associated with switching equipment receiving incoming calls and routing these calls to call centers, is typically done with reference to statistical history of call center activity, and routing to call centers is to queues at the call centers. In this conventional method, activity at each call center in a network is tracked and provided to service control points, and incoming calls are routed to the calls centers based on the latest available history. As an example of such a history algorithm, if there are two call centers in the system, and the latest statistical history indicates that call center 1 has received twice as many calls as call center 2, calls will be preferentially routed to call center 2 at a ratio to balance the activity. In this conventional system calls are routed from the network level to queues at the call center level. Once a call is received in a queue at a call center, the caller waits until his call is answered in order.

Referring now to FIG. 1, in a unique embodiment of the present invention, termed by the inventors Agent Level Routing, actual transactions at the call center level, rather than historical summaries, are reported from call centers to service control points, and calls are routed to agents rather than to queues or groups. Referring to call center 121 as an example, transactions of central switch 123 are monitored by T-Server 207 executing on processor 223, and shared on a continuing basis with T-Server 207 running on processor 208 associated with SCP 101. This activity data is stored and accessible with reference to stat server 209 on processor 208. Activity of central switch 124 at call center 122 is reported via link 211 also to T-Server 207 in cloud 100 (which represents one instance of possible multiple SCPs and T-Servers in the network. Each T-Server may serve more than one SCP). Actual activity at all call centers is reported to all SCPs in this manner.

In addition to this actual call center activity data, data relative to agent skills and the like is also provided and stored at the network level. For example, when an agent logs in at a call center, the availability of this agent is reported to the network level, and the stat-servers at the network level have agent profiles for reference in making routing decisions.

In the instant embodiment an incoming call 107 at SCP 101 is processed, for example, with the aid of IP 102. With information about the needs of the caller, T-S 207 makes reference to the stat-server data of actual agent status at call centers, which is continuously updated via digital network links 210 and 211, for example, from call centers, and to the available data on agent profiles and the like, which is updated as well, but at perhaps longer time increments. T-Server 207 makes a routing decision to an agent based on the best fit with the latest available data.

Once the routing decision has been made at the network level, the destination decision for the call is transferred by T-Server 207 running on processor 208, for example, at the network level, to T-Server 207 at the call center where the agent to which the call is to go is resident. For exemplary purposes assume the destination is an agent at call center 121 (FIG. 1), and the destination information is sent to T-S 207 running on processor 223.

The call is received on line 105 at the call center and matched with the destination data received by T-S 207 on link 210. T-S 207 on processor 223 now routes the call to the agent.

Call-center-level routing in embodiments of the present invention was described above, and may be done in the instant embodiment as well. For example, T-S 207 running on processor 223 has received a call on line 105 and matched that call with data received on link 210, which data includes an agent destination for the call based on the best fit available to T-S 207 running on processor 208 at the network level. In the time since the original routing occurred and the call and data have been received at call center 105, the situation may have changed. The agent to which the call was routed may have, for example, logged off, and is no longer available. T-S 207 at processor 223, executing a routing algorithm, may now reroute the call to the agent who is a next best fit and available at call center 121.

As a further example of agent level call routing, consider a call received at SCP 101 from a customer who speaks Spanish, and indicates a preference for a Spanish-speaking agent. In FIG. 1 the pool of Spanish-speaking agents is represented by inclusion area 241, encompassing workstations 132 at call-in center 121 and workstation 134 at call-in center 122. An agent profile provided to stat-server 209 at the network level for each of these agents indicates the Spanish skill. The continuously updated transaction information from call centers 121 and 122 indicates the agent at telephone 138 is available, while the agent at telephone 142 is not available. Given this information, the call will be routed to call center 121 on line 105, and the data as to agent destination will be sent to T-S 207 at call center 121 via digital link 210.

In summary, in the instant embodiment, agent level routing is accomplished by providing actual call center agent status on a continuing basis to Service Control Points along with agent skill profiles and the like. Incoming calls are then routed to agents, rather than to queues at call centers. At the call center to which a call is routed with destination data for an agent, a further opportunity for routing allows such calls to be rerouted at the call center level.

In the matter of IPNT calls which may be directed first to a processor associated with a SCP in an intelligent network, given the origin of the call, just as is available form an ANI field, for example, in a conventional telephony call, decisions may be made as to agent level routing in a manner similar to the decisions made for conventional calls. It is only the mechanism for directing the IPNT calls that differs.

Moreover, IPNT calls directed to a processor associated with a SCP may be processed by an IP in an automatic manner, even including voice response, eliciting further information from the caller, which may then be factored into the routing of the calls.

It should also be understood that reception of and routing of IPNT calls need not be done at the same equipment and using the same software as is used for conventional telephony. Entirely separate centers may well be provided in various embodiments of the invention for handling IPNT calls. Internet servers may be provided for example, wherein adjunct processors, IP functionality, and the like is provided for IPNT in a manner parallel to that described herein for conventional telephony. In the matter of call center operation and management the idea of a dumb IP network may be just that. Intelligence is needed and preferred for managing large call volume to a wide range of possible destinations for best customer service.

Parallel Data Transfer and Synchronization (3201)

In another aspect of the present invention enhanced functionality is provided in routing and processing telephone calls from Service Control Points (SCPs) and other origination points at the network level or at other call centers established for servicing callers seeking service. This enhanced functionality enables agents at such call-in centers to have immediate access to information derived both from callers and from stored data. In descriptions below of the instant embodiment, assumption of SCP 101 in the network cloud and call center 121 is made for principle purposes of illustration.

In descriptions above, referring now to FIG. 1, an intelligent peripheral (IP) 102 was described, serving to aid in initial processing of calls from persons seeking services from an organization providing such services from one or more call-in centers. In the above descriptions also, such callers were referred to as customers, following a continuing example utilizing an organizational structure having a technical service call-in operation for such as a computer equipment manufacturer.

Following the example of persons calling in to seek technical services in installing and/or configuring computer-related products, when such a caller first connects (FIG. 1, vector 107, SCP 101), initial processing will typically include eliciting information from the caller relative to such as caller preferences and relationship of the caller to the service provider's customer database. For example, the caller may have just purchased a model of one of the provider's products, meant to be installed in or connected to a particular make and model computer, and is experiencing difficulty in installing the product and making it function properly with the computer. In another instance such a caller may have had the provider's product for some time, and is only recently experiencing difficulty.

Most manufacturers provide a service whereby a customer may register a product, and in the process of registration a range of information from the customer is solicited, which will typically include the exact nature of the product in question, including model number, and also the characteristics of the computer (in this example) to which the customer has installed or is attempting to install the product. If a customer has registered his/her purchase, that information will typically be recorded in the customer database, which, referring to FIG. 1, may be stored on Data File Server 303 connected to LAN 301, to which processor 223 running an instance of T-S 207 is also connected. In other instances there may be other information stored in the customer database. For example, in the case of an insurance company, the customer's name and address, policy number, and the like will be in the database.

If there is information about a call in a customer database at a call center, it will be advantageous to both the customer and the service provider to access that information and provide same to the agent who handles the customer's call. Such information cannot be retrieved, however, until and unless some correlation is made between the incoming call and the database.

In the instant embodiment of the invention, which is exemplary only, initial processing is used incorporating IP 102 to elicit information from a customer. This may be done preferably by recorded query and voice recognition. In such a system a call is answered, and a menu system is used to categorize the caller and to elicit and record sufficient information to enable routing (as described above) and hopefully to correlate a customer with an existing database. By recording is meant enrolling the nature of the responses in some form, not necessarily by voice recording. For example, a typical initial processing transaction involves a recorded query to the caller such as "Do you prefer Spanish or English". In some locales the query might be phrased in a language other than English. The caller is requested to respond typically by selecting a key on the touch-tone pad of his/her telephone. In many instances now as well, voice recognition is built into the initial processing machine intelligence, and the customer is instructed in verbal response, such as: "Say Yes or No". The IP in this case recognizes the response and codes data accordingly.

Information derived from a caller in such initial processing in conventional systems, as has been described herein above, is coded and sent with the routed call, to be dealt with at the call center to which the call is routed after the call is received. In instant embodiments of the present invention, such data, and in some cases other data, is routed to a call center in parallel with the routed call, over a digital network link, allowing the data to precede the call in most cases. The data is re-associated with the call at the call center in a unique fashion described below. This parallel data transfer also makes the transfer switch-independent.

Referring again to FIG. 1, an instance of T-Server 207 is running on processor 223 connected to central switch 123 of call center 121. Processor 223 is connected to digital data link 210, and switch 123 is connected to the PSTN line 105. In the exemplary embodiment there is an instance of T-Server 207 also running on processor 208 associated with SCP 101. In the instant embodiment T-S 207 at processor 208 requests a semaphore from T-S 207 at processor 223 at the call center level. The semaphore is a virtual routing point in the call center that is associated with the destination of the call, but is not the same as the destination of the call. Also, the semaphore is freed as soon as the call is completed. Once the semaphore is returned, the routed call is forwarded to switch 123 in this example over line 105 to the destination associated with the semaphore. Data associated with the call, which may be data elicited from a caller with the aid of IP 102, is not coded and sent with the call, however, as in the prior art, but rather transferred to T-S 207 at processor 223 over digital network line 210.

As digital network link 210 is generally a faster link than telephone line 105, the data associated with a forwarded call will typically arrive before the call. This is not, however, a requirement of the invention. The data sent over link 210 to T-Server 207 on processor 223 includes not only data associated with the call, but the semaphore as described above. The call received on line 105 is not transferred directly to a final destination but to a semaphore routing point. When the call and the data are available, the call center T-Server 207 associates the call with the data by the knowledge of the semaphore to which the call has been associated. From the semaphore routing point the call is routed on to the final destination.

The semaphore can be accomplished in a number of ways. For example, the call can be directed to a virtual number and the data may have the virtual number in one field of the data protocol. The semaphore could also be an agent's extension number, but the call is still routed to a semaphore control point to be associated with the data before being routed on to the agent. Those with skill in the art will recognize that the semaphore association may be made in other ways as well.

The data typically in this embodiment is sent via network 301 to a VDU of the network interface at the operator's workstation to which the call is finally routed. This may be, for example, IF 331 or 332 in FIG. 1. Moreover, data associated with the call and transferred to T-S 207 at the call center may be used to associate the caller with the customer database in Data File Server 303, and to retrieve further data which may also be forwarded to the VDU at the agent's workstation. As described above, it will most usually be the case that the data will arrive before the call, and correlation with a customer database may therefore be done before the call arrives.

The re-association (synchronization) of the call and the data at a re-routing point also affords an opportunity for further re-routing. There will be, as described above in the section on agent-based routing, some calls wherein the agent to which a call is originally has become unavailable in the time wherein a call is transferred. In this case T-Server 207 may re-route the call from the semaphore point to another agent, and send the data to the new destination.

It is not strictly necessary in the instant embodiment that the data be transferred by another instance of T-Server as described in the preferred embodiment immediately above. The call forwarded and the data transferred may in fact be sent by an originating entity such as another call center (i.e. PBX), an SCP or IP (network IVR), or some other IVR which may or may not be in the network.

In the matter of IPNT calls received at processors associated with SCPs, whether the SCPs are adapted to handle both conventional and IPNT calls, or just IPNT, data elicited from the caller may be prepared and provided by a separate link to a call center, and re-associated with the IP call redirected to an agent at the call center, or to a lower-level routing point at the call center, where both the call and the data may be rerouted. In this fashion all of the advantages of the invention described for conventional telephony may also be provided for IPNT.

Statistically-Predictive and Agent-Predictive Call Routing (3202)

In still another embodiment of the present invention predictive routing is incorporated into machine intelligence to expedite routing in a most cost-effective manner. Predictive routing according to embodiments of the present invention is based on knowledge of latency experienced in equipment while implementing certain operations, together with reasonable, but non-obvious assumptions that may be made to expedite operations. It is in implementing the assumptions that the inventions lie in the instant aspects and embodiments of the invention.

Referring again to FIG. 1, in the general case T-Server 207 running on processor 208 does call routing for calls incoming at SCP 101. This routing is done with the aid of data stored at stat-server 209, which may be data obtained from call centers on some regular basis.

In the instant embodiment related to group-predictive routing, incoming calls are routed to groups at call centers (call center 121 for example). In routing calls to groups, the goal is to route an incoming call to the group which has the lowest projected handling time for the call. The algorithm, for example, for handling time may be the present number of calls in the group queue times the historical average call length.

In this embodiment the projected handling time is extrapolated on past history and the last action which occurred, and is re-computed each time feedback from the group is received. The predictive nature is derived from the fact that each time a call is routed, an assumption is made that the new call is added to the queue at the group to which it routed, without waiting for the call center to return the information, which involves latency. For example, when a call is received at SCP 101 (FIG. 1), there is a finite time involved before a routing decision may be made. Once the call is routed, there is a delay (latency) before the call is received at the call center and added to the group queue (in this example). There is a further delay for T-Server 207 to be cognizant of the arrival of the call. Then there is a delay until the time that T-Server 207 at processor 207 sends updated group queue data to T-Server 207 at processor 208, which updates the historical data at stat-server 209.

The overall latency and delay until historical data may be updated at the network level may vary, but an exemplary assumption may be made for purposes of illustration. Assume the overall delay between actual updates is twenty seconds. If calls are being received at the SCP at the rate of ten calls per second, two hundred calls will be received to be routed in the time between updates of historical information upon which routing decisions are made. In the group-predictive embodiment described, each time a call is routed at the network level, an assumption is made that the call is actually received at the call enter group queue, and the data (stat server 209) is recalculated based on that assumption. The next call received is then immediately routed based on the recalculated data based on the assumption. The update that eventually arrives is used to readjust the database to reality, and call routing continues between updates based on the assumptions made.

In the case of routing calls to logical destinations wherein further routing is done at the call center level, as described above for agent-based call routing, wherein agent status is reported to the network level, predictive routing according to an embodiment of the present invention may be done similarly to the predictive group routing described above. In the agent routing case incoming calls are immediately routed with an assumption that the agent to which the call is routed is then busy, and the status is corrected when actual agent state is returned.

Figure 3:
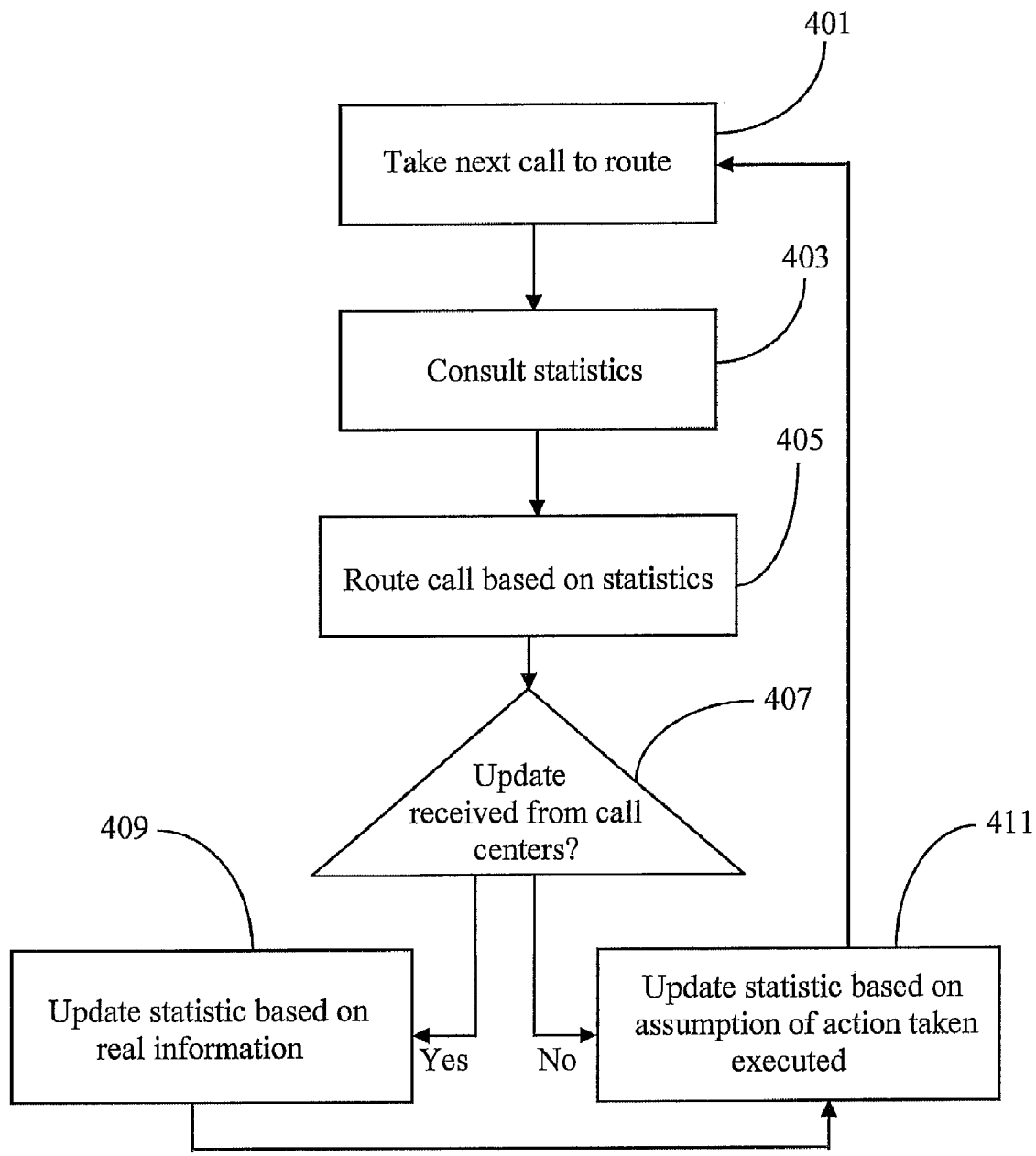
FIG. 3 is a process flow diagram depicting steps in a process according to a preferred embodiment of the present invention.

FIG. 3 is a process flow diagram depicting the decision and action flow for a predictive routing process according to the instant embodiment of the invention. At step 401 action is precipitated on a next call to be routed. Action is typically controlled in this embodiment by an instance of T-Server 207 running on a processor at the network level. At step 403 current statistics are consulted, which, in the case of group level routing comprises an indication of projected handling time for each group in the decision set to which calls may be routed.

At step 405 the call is routed based on the statistics available. At step 407 it is determined whether or not a real update to the statistics has been received. If Yes, at step 409 the statistical data is updated to reflect the real information, correcting all assumptions since the last real update, if any correction is necessary. Then control passes to step 411, where statistics are updated based on the routed call as well.

If a real update is not yet received, at step 411 the statistical data is updated based on an assumption that the call just routed was completed, and the call is added to the statistics, which are recalculated based on the assumption. Then a next call is taken to be routed at step 401.

In the case of agent level routing the process flow is much the same as that shown in FIG. 3, except calls are routed at step 405 based on agent status, and updates are based on agent status. That is, when a call is routed, the assumption is that the agent is then busy. Agent status is updated to real data as real data is reported back to network level from call centers. If no real data comes back, an assumption based on statistical call length is used to 'best-guess' re-availability of that agent.

Group level predictive call routing may be done for conventional call centers that are capable of reporting only historical data to the network level. Predictive call routing based on agent status is only possible in the unique case wherein actual status of call center switches may be reported to network level.

It will be apparent to those with skill in the art that predictive call routing may be applied to directing and redirecting of IPNT calls as well as to routing conventional telephony calls as described above. The differences are only in the details of the connectivity and data protocols, all of which is well-known in the art. The inventive subject matter in predictive routing is in the decisions made based on predictive assumptions, not in the nature of the call or the organization of data packets and the like.

Dynamic Re-Routing (3203)

In yet another aspect of the present invention, dual routing is performed. Reference is made again to FIG. 1, wherein a network level system shown in cloud 100 is enabled to perform original routing by virtue of an instance of T-Server 207 running on processor 208. In the instant embodiment routing is done at the network level by any of the methods discussed above. That is to group level, agent level, logical application, and so on. Original routing, however, is not done to the actual destination. Rather calls are routed to a call-center-level routing point, and data is sent to the call center via the digital data link, such as link 210 to processor 223 running an instance of T-Server 207 and connected to switch 123. The data sent comprises an indication or instruction of how the call should be treated.

Whenever a call is routed to a call center, it is never certain that by the time the actual call arrives, the destination will still be available, or the best fit for the call. There are many reasons for this. For example, because of latency in transmission and so forth, other calls may be routed to the same destination in the interim. Also, in many systems switches at the call center level are also accepting local calls as well as calls routed from the network level. In other instances some equipment malfunction of fault may misroute one or more calls. The uncertainty of availability when the call arrives is the reason for the instant embodiment of the invention.

At the call center routing point the call is synchronized with whatever data is sent, and a second routing request is generated. This second request is referred to by the inventors as "double-dipping". The second routing request is made to a local router running typically as a function of the instance of T-Server 207 executing on such as processor 223 (FIG. 1).

Because the local router is closer to the requested destination, and because it arbitrates all incoming calls, it can confirm the original routing assuming the original destination is still free, or it can re-route the call if the destination is no longer available, or queue the call, etc.

Figure 4:
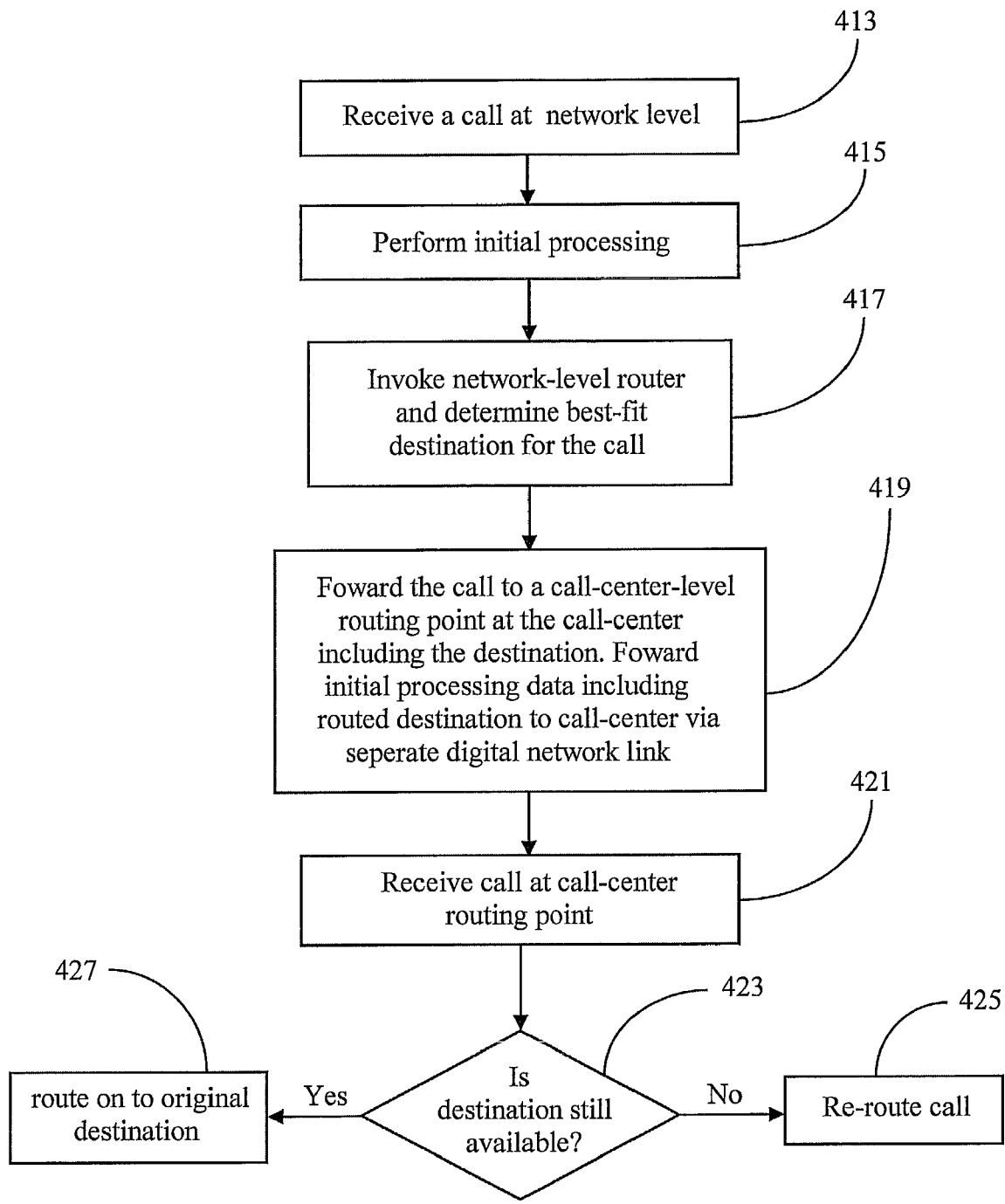
FIG. 4 is another process flow diagram depicting steps in a process according to another preferred embodiment of the present invention.

FIG. 4 is a process flow diagram depicting a process flow in the "double-dip" embodiment of the present invention described herein. At step 413 a call is received at the network level. At step 415 initial processing is accomplished, which may include eliciting information from the caller. At step 417 the network-level router is called, and a best fit destination is determined for the call based on the information available at the network level.

At step 419 the call is forwarded, but not to the best-fit destination determined. The call is forwarded rather to a routing point at the call center local to the best-fit destination. Data associated with the call, including the best-fit destination determined in step 417 is forwarded to the call center via a digital data link such as link 210 in FIG. 1. At step 421 the call is received at the call center routing point.

At step 423 it is determined whether the originally routed destination is still the best destination according to information at the call center level. If so the call is forwarded to the original destination at step 427. If not, the call is re-routed based on local information by the local router.

It will be apparent to the skilled artisan that dynamic rerouting, like other aspects of the present invention, may apply to IPNT calls as well as to conventional telephony as described above. IPNT calls may be directed to selected destinations, synchronized with data perhaps provided by a different route, and the redirected, even several times if necessary.

External Positivistic Forward Transfer in Call Routing Systems (3204)

In yet another embodiment of the present invention calls are routed to call centers and data passed in a switch-independent manner, similar to that described above in the section entitled Parallel Data Transfer and Synchronization. In the previous description, however, the instance of T-Server running at the network level requests a semaphore from the call center. When the semaphore is returned, the call is routed and data is transferred on the digital network link, the data including the semaphore, which allows the data to be synchronized with the call at the semaphore point at the call center level.

In the instant embodiment, time to route and transfer is improved by having the instance of T-Server running at the network level (on processor 208 in FIG. 1, for example) co-opt a semaphore, based on the best available information then at the network level. This presumption by the router in the T-Server at the network level eliminates the time required for negotiation with the T-Server at the call center. The semaphore assumed by the network level T-Server is freed later when CTI information is returned that the call was correctly processed.

As in the previous description, when the routed call arrives at the call center semaphore point, the data, by virtue of having an indication of the semaphore included, is synchronized with the call and the call is forwarded to the destination. Data may be provided to a VDU at the agent's workstation at the destination via LAN connection as shown in FIG. 1.

Figure 5:
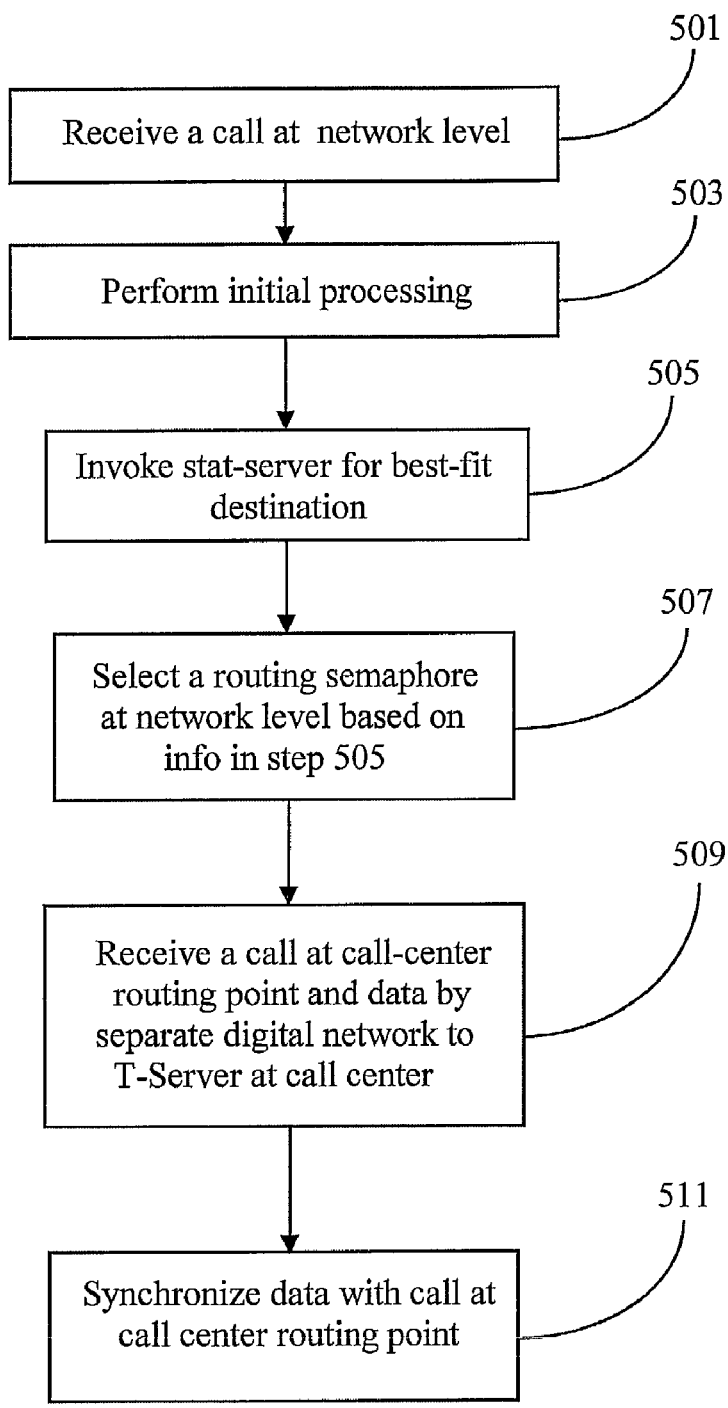
FIG. 5 is yet another process flow diagram depicting steps in yet another preferred embodiment of the present invention.

FIG. 5 is a process flow diagram indicating steps in practicing this embodiment of the invention. At step 501 a call is received. At step 503 initial processing is performed. At step 505 the router at the network level consults a stat-server (see element 209, FIG. 1) for a best-fit destination. At step 507 the router selects a semaphore destination based on the information in step 507. At step 509 the call is routed to the call center semaphore point and associated call data is routed via a separate data link (see link 210, FIG. 1) to the call center. At step 511 the data and the call are synchronized at the routing point. Further step are as indicated above in the section titled Parallel Data Transfer and Synchronization.

It will be apparent to the skilled artisan as well that positivistic forward transfer may apply to intelligent routing of IPNT calls, just as it applies to conventional telephony calls as described in this section.

Agent-Initiated Dynamic Requeuing (3206)

In yet another aspect of the present invention a method is provided for rerouting calls from agent level, wherein the agent discovers, having received a call and interacted with the caller, that the call was misrouted, or needs attention by another qualified agent. By misrouted in this context is meant that for whatever reason the agent that received the call is unable to provide the service the caller wants or needs. The call may have been physically misrouted due to some error in hardware or software, so it is handled by a different agent than to whom it was originally routed, or, the call may have gone to the right agent, but the caller gave the wrong information, or insufficient information, for the system to get the call to an agent able and ready to provide the needed service, or, during the call, need arises for an agent with specific skills or knowledge.

In this embodiment a first agent has received the call and has discerned from the caller that another agent is required to handle the call. Potentially the agent also has a VDU with the caller's data displayed and input apparatus (keyboard, pointer) with which to communicate with the local T-Server.

In the conventional case the agent would be limited in options. The agent would transfer to or conference a physical phone number on the local or a remote central switch. The Automatic Call Distributor (ACD) on that switch would requeue the call. If the ACD were configured as a network ACD the call could potentially be distributed to other sites, but network ACD products typically work only between switches of the same manufacture. Also, the caller may have to wait again the full queue time.

In the instant embodiment of the present invention, by virtue of the presence and interconnectivity of the local instance of T-Server running on a processor (223, FIG. 1) connected to the local switch (123, FIG. 1), also connected to the agent's equipment by LAN 301, and using unique control routines provided in T-Server 207, the agent hands the call back to a local or a network routing point, potentially with added data elicited from the caller to better aid in further routing.

This operation is essentially agent-initiated double-dipping ala the description above in the section entitled Dynamic Rerouting. At the rerouting point rerouting of the call is requested of the local instance of T-Server 207, and the call is redistributed. The agent does not know who is available where for this transfer, and ACD is not involved. The agent, however, in this embodiment of the invention may have a choice of selecting a cold, warm, or conference transfer, which the agent may do by any convenient input which has been programmed into the control routines in the preferred embodiment.

In a cold transfer, the agent simply sends the call back to the re-routing point with whatever new data can be added, and the call is then transferred to a new agent directly without any participation by the first agent. In a warm transfer, the first agent is connected to the next agent to whom the call is re-routed before the caller is connected, allowing the first agent to confer with the next agent before the caller. In a conferenced transfer the first agent and the caller are connected to the next agent at the same time.

It will be apparent to the skilled artisan that agent-initiated re-routing may apply to intelligent routing of IPNT calls, just as it applies to conventional telephony as described herein. For example, an agent may ultimately receive an IPNT call at his/her PC/VDU, either with or without a screen pop of data pertaining to the client placing the call and/or to scripting for the agent to follow in handling the call. It may become apparent to the agent that the call has been mis-routed, or would, for whatever reason, be better handled by another agent. By virtue of adaptive software executing at the agent's station or at a connected processor, or both, such a call may be handed back to a routing point with whatever additional data the agent may have ascertained, and then be rerouted to a (hopefully) better destination based on the original and\or new data.

Number Pool Data and Call Synchronization

In yet another aspect of the present invention, a unique routing method is provided for rerouting calls between call centers while minimizing the number of destination numbers required for the purpose. It is well-known in the art that the overall cost of operating a call center is strongly influenced by the number of destination numbers that have to be maintained to provide for peak traffic. In this aspect of the invention two or more call centers are assigned unique number pools of destination numbers that are used by a router in a sequential order to reroute calls between call centers.

Figure 6:
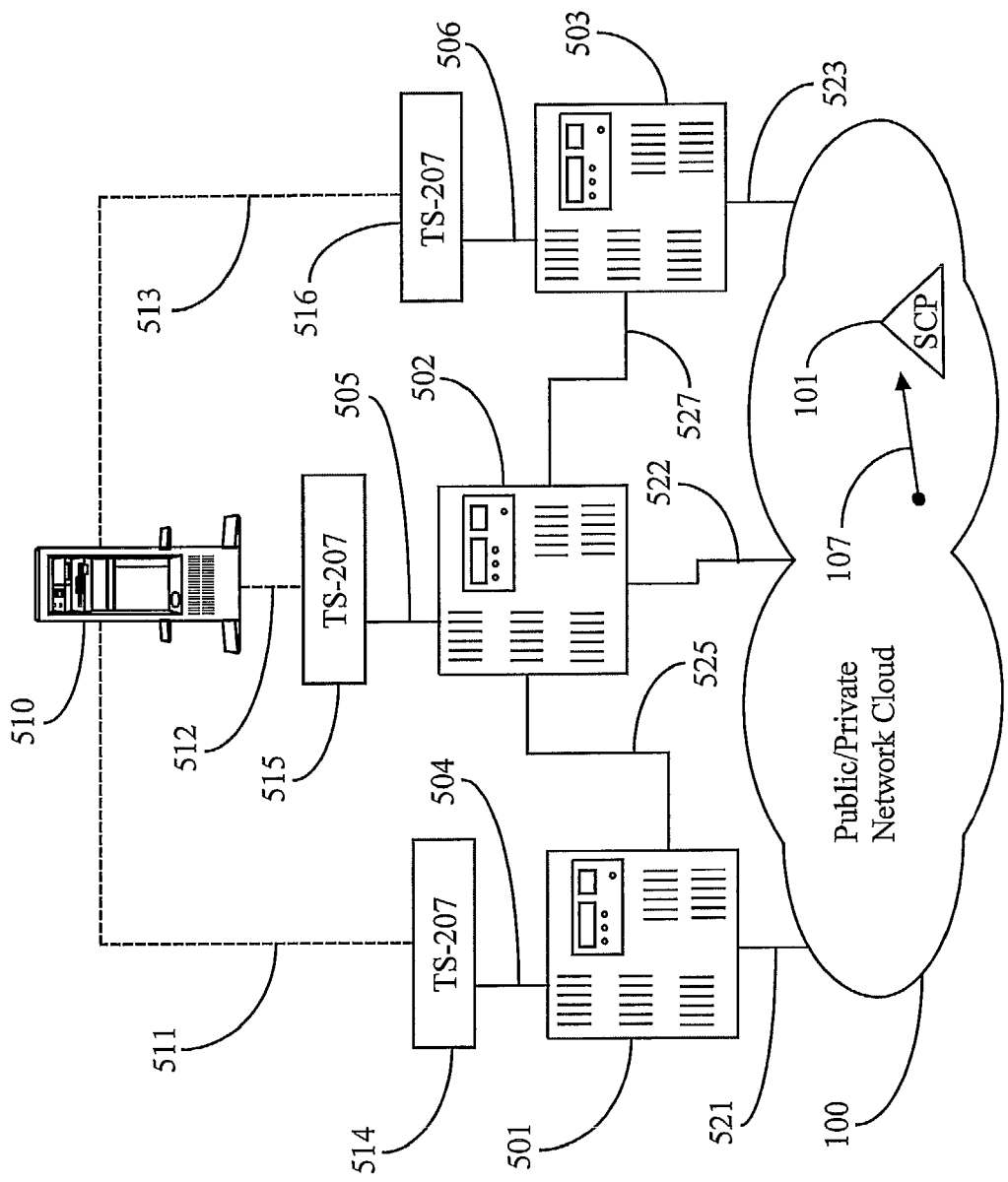
FIG. 6 is a system diagram of a call-rerouting system according to an embodiment of the present invention.

Referring now to FIG. 6, three call centers 501, 502, and 503 are illustrated having each an incoming telephone line over which calls out of network cloud 100 are originally routed. Line 521 carries calls to call center 501, line 522 to call center 502, and line 523 to call center 503. A service control point (SCP) 101 is shown in network cloud 101 with a vector 107 representing incoming calls that are initially processed, then routed to one of the three call centers.

It will be apparent to those with skill in the art that there may be more than one SCP sending calls to each call center, as there may be multiple 800 numbers used, the network may take any of several forms, and there may be more than the three call centers shown. The simplified representation of FIG. 6 is for purpose of illustration. There may also be other equipment in the SCP and a variety of protocols utilized in call processing and original routing.

It is unfortunate but true that not all calls routed to a call center are correctly routed, and may be handed over to agents at the call center where originally routed. A certain percentage of calls will be discovered to have been incorrectly routed, and to require rerouting to another call center. There may be any number of reasons for incorrect routing, and the reasons are not pertinent to the present aspect of the invention. What is important in this regard is that some calls will have to be rerouted.

In a conventional system, calls originally routed are sent to a destination number at a call center by a semaphore system, as has been described above, and sufficient destination numbers must be assigned and maintained at each call center to account for peak traffic. At the call center, calls are typically rerouted to agents at extensions at the call center, based on origination information and preprocessing information elicited at the SCP. The process of matching calls arriving at a call center with call data, and further routing calls to agents, and then clearing the semaphore so the destination number is free to be used again typically takes about twenty seconds.

The time of twenty seconds to handle an incoming call strongly influences the number of destination numbers that must be maintained. For example, if twenty incoming original calls per second are to be handled, a call center will need 400 destination numbers to allow twenty seconds to handle each call.

I like manner, in a conventional system, calls that have to be rerouted will each take the twenty second processing time, and additional destination numbers will have to be maintained for the rerouting traffic.

In the embodiment of the present invention illustrated by FIG. 6 a main re-router 510 is provided connected by a digital network link 511 to call center 501, by digital network link 512 to call center 502, and by digital network link 513 to call center 503. In practice, actual routing is accomplished, as known in the art, by control routines executed on a computer platform, known typically in telecommunications art as a processor. In the description herein the term router is meant to encompass all of hardware/software characteristic of routing, thus reference is made to router 510.

In this embodiment the connection from router 510 to each of the call centers is through dedicated processors (514, 515, and 516 respectively) further connected to the respective call centers by CTI links 504, 505, and 506, and each running an instance of T-server 207 described previously. This is a preferred embodiment, but in some embodiments the connection may be directly to the switch at the call center, assuming that the call center switch is adapted to execute the necessary control routines in conjunction with router 510 as described more fully below. Further, in this embodiment call centers 501, 502, and 503 are interconnected by telephone lines 525 and 527. These lines are preferred, but not strictly required in practicing the invention, as calls may also be rerouted between call centers back through network cloud 100.

It will be apparent to one with skill in the art that there may be many more than three call centers such as 501 connected to the network. In this instant embodiment there are only three call centers shown, however, this number is deemed sufficient for the purposes of illustrating an embodiment of the present invention.

In conventional network routing systems, as described above, destination numbers are assigned to a typical call center and it to these destination numbers that incoming calls are routed. These destination numbers are phone numbers paid for by the company that operates the particular network. A typical call center may have many hundreds of destination numbers assigned to it. In a typical embodiment, each destination number costs about one dollar per month to maintain. In the case of a large network there may be many call centers, each having many hundreds of destination numbers that are generating costs to the company.

In the present embodiment of the invention unique number pool assignments are made to each call center interconnected by router 510, and used sequentially for rerouting of calls between call centers.

In the instant embodiment incoming calls are routed to various call centers, such as call center 501, via Telephony lines 521, 522, and 523, as described above. The call center destination to which a call will be sent is based on information obtained from the caller at SCP 101. Call center 501 having received a call, then sends a Call Arrival Message (CAM) to main router 5 10. Main router 510 uses the information provided in the CAM to make a routing decision. Main router 510 may also, in some embodiments, request additional information by sending a Route Request Message. A RRM would typically access additional information related to the caller that may be stored on a database or file server somewhere on the network. After a RRM is received, a Route Request Response (RRR) is sent back to main router 510. If main router 510 determines that the call has been routed properly, then the call is forwarded on to its final destination such as an agent's extension, etc. In this case conventional destination numbers would apply, and a semaphore would be sent back to the origination point when that particular call has been forwarded freeing its destination number for the next call. This process takes approximately 20 seconds over conventional network lines.

However, if it is determined that a more appropriate call center such as call center 503 would best handle the call that arrived at call center 501, the call is rerouted to call center 503. Router 510 maintains a data set (pool) of unique destination numbers assigned to each connected call center for the purpose of handling the rerouted traffic. These are not the same destination numbers used by origination points in the network for sending original calls to call centers. It is not required that there be any sequential association in the actual destination numbers. What is required and maintained by router 510 is that the destination numbers at each call center be identified in a sequential order. For example, there is a first number for center 501 a second number for center 501, and so on, up to a last number for center 501. The same is true for numbers assigned in a unique pool to call center 502 and call center 503.

Consider as a very simple example that the unique pool of rerouting destination numbers for call center 502 has three numbers designated for our purpose as A, B, and C. A call arrived at call center 501, and it is determined that the call must be rerouted to call center 502. This call is sent to destination number A. A second call arrives at call center 501 for which it determined that rerouting to call center 502 is proper. This call will be sent to destination number B at call center 502. Similarly a call then arrives at call center 503 for which it is determined that rerouting to center 502 is needed. This call is rerouted to destination number C at call center 502. Now, the next call at either call center 501 or 503 for which rerouting to call center 502 is needed is sent to destination number A at center 502.

As operation continues, calls rerouted to call center A are sent sequentially to the identified numbers in the unique number pool associated with call center 502, always returning to the first after the last is used, then proceeding again through the pattern. At the same time, calls arriving at either center 501 or 502, to be rerouted to call center 503, are sent sequentially to identified numbers at center 503, and calls rerouted from 503 and 502 to 501 are sent sequentially to identified unique numbers at 501.

As previously described, there may be many more than the three call centers shown, and there may be many more than three destination numbers assigned to each call center in the unique rerouting destination number pool. The sequencing may be quite complex, but, at each call center, the unique numbers are used in a sequential pattern so that after one number is used, it is not reused again until all of the other numbers assigned to that call center for the purpose of rerouting are used once more.

There is another difference between the rerouting and the original routing. That is that the origination and the final destination of a call are both known in the rerouting, and a rerouted call sent to one of the numbers in the unique rerouting pool may be therefor almost immediately handed off to an agent, or to a queue for an agent. The processing time is about one second. The quantity of destination numbers necessary for each call center in the unique pool is thus one number greater than the number of calls that can be routed by main router 510 in one second. Typically router 510 will be sized based on empirical data and statistics. If, in a hypothetical situation router 510 is capable of rerouting 100 calls per second, then the quantity of destination numbers for each call center is theoretically 101, to be sure that each number used has a full second to clear before it is used again. In practice, a margin for safety may be employed by providing a quantity of destination numbers equaling, for example, 1.5 times the number of calls that can be routed in one second.

In FIG. 6 and the accompanying descriptions above relative to FIG. 6, a single router was described, referred to as router 510. In alternative embodiments of the present invention there may be more than a single router instance. There could, for example, be a router operable at each of the switches 501, 502, and 503 shown operating either on processors 514, 515, and 516, or, if the switches permit, on the switches. In another alternative router 510 could be connected to other routers in other locations not shown, and these further routers may be connected to other switches at other call centers, and so on. In these alternative embodiments, incorporating multiple routers, individual routers may negotiate with other connected routers, delivering messages, unique destination numbers for routing, unique call ID, any data attached to the original call or retrieved based on data attached to the original call, so the other routers may perform continued or additional routing.

Multimedia Managing and Prioritized Queuing System Integrated with Intelligent Routing Capability (3310)

While intelligent routing is performed within call centers with regards to COST calls, DNT calls, and E-mail in systems known to the inventor, but not necessarily known in the art, the routing function is typically not integrated to encompass multiple forms of received communication, and does not typically include faxes or voice-mails. Therefore, it is an object of the present invention to provide an intelligent, integrated routing system that will allow client's communications of all sorts to be stored according to pre-set priority rules, and be delivered to next-best available agents based on intelligent routing implementations such as skill-set of the agent, predictive routing, and so on. Such a system will also include typically overlooked forms of communication such as voice-mail messages and facsimiles messages.

It is further an object of the present invention to provide a system as described above wherein live callers in queue may receive periodic options to change their form of communication to a virtual communication requesting a specific and timely response from a best-matched service agent.

Various elements found in the priority co-pending patent applications as listed in the "Cross-reference to related documents section" will be combined and employed along with newly innovative techniques and apparatus to provide the enabling disclosure of the present invention as provided in the examples to follow.

Figure 7:
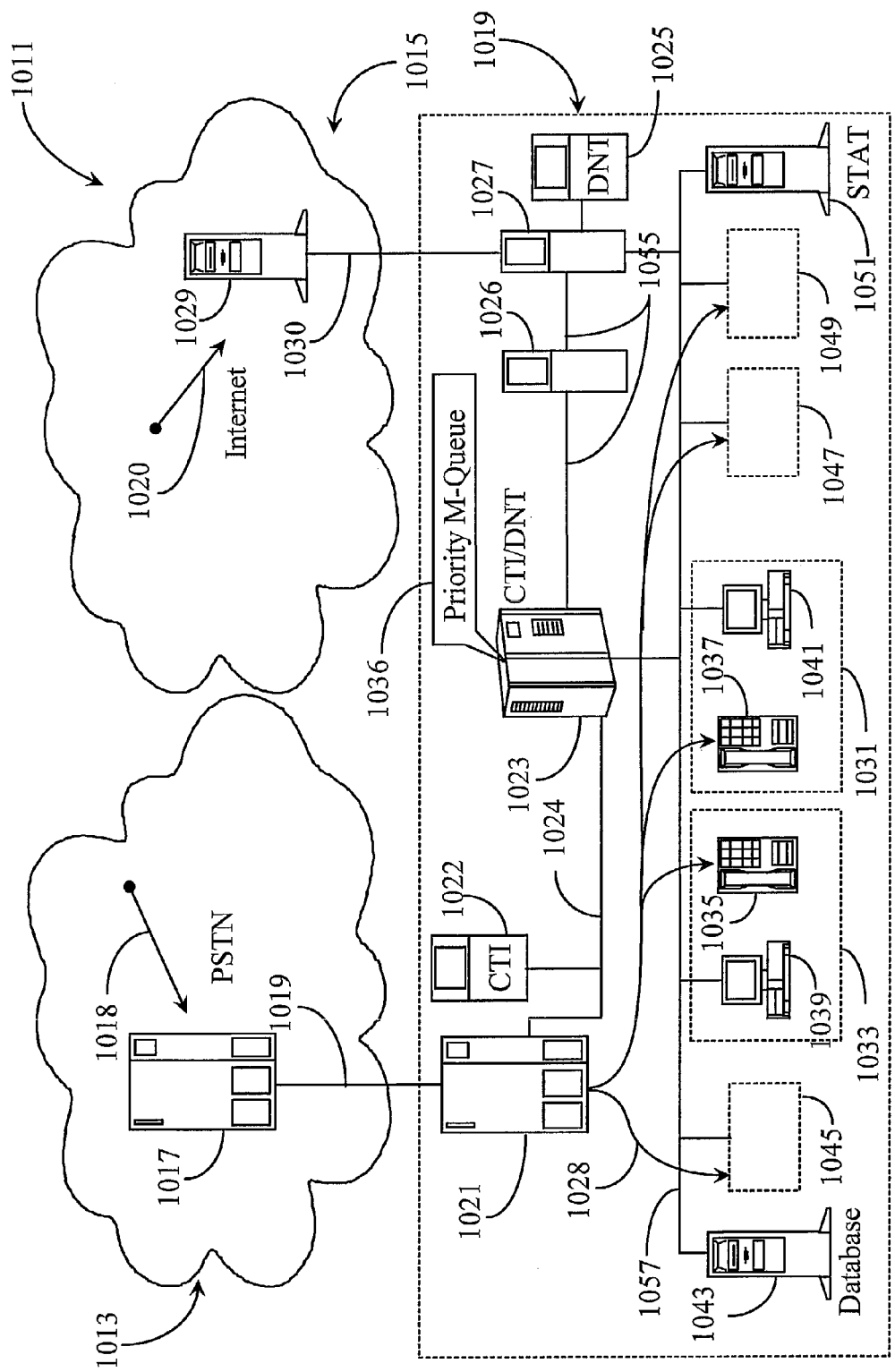
FIG. 7 is a system diagram illustrating a CTI/DNT-equipped call center according to an embodiment of the present invention wherein one intelligent routing system may route all communications received.

FIG. 7 is a system diagram illustrating a CTI/DNT-equipped call center according to a preferred embodiment of the present invention wherein one intelligent routing system using a single set of rules may route all call-center communications received. Communications architecture 1011 comprises a CTI/DNT call-center 1019 that is linked to a publicly-switched telephony network (PSTN) 1013 via telephony trunks 1016 and to a wide-area-network (WAN) 1011, which in this embodiment is the well-known Internet, via a digital link 1030. The Internet is used as an example because of its universal nature, and standardized protocol. Internet 1011 may, in other embodiments, be of the form of a corporate Intranet or other private WAN as may be known in the art. Also PSTN 1013 may be of the form of a private telephone network rather than a public network as shown. The examples illustrated and taught herein utilize a public-access infrastructure only as a preferred embodiment. There are many other possibilities that are well known in the art.

COST calls represented by vector 1018 arriving at a switching apparatus 1017 in the PSTN may originate from anywhere in PSTN 1013. Similarly DNT communications represented by a vector 1020 arriving at an Internet routing node 1029 may originate from any client having a computer running the appropriate software and having access to Internet 1015.

Telephony trunks 1016 will typically provide for outbound calls from call-center 1019 as well as for in-bound calls switched from the network. Digital 1030 may take any of a number of forms capable of carrying DNT telephony data as well as other forms of digital data. Other network-level hardware such as additional processors, servers, and the like for enhancing pre-routing capabilities such as routing calls to additional call centers and so on are not shown in this embodiment, but may be assumed to be present. It may also be assumed that a company hosting a call center such as call center 1019 may also host a number of additional centers distributed over a wide geographic range. However, the methods and apparatus of the present invention may also be applied for a single call center hosted by a single company or other organization.

Referring again to FIG. 7, COST calls to call center 1019 arrive at a switching apparatus 1021, typically at a routing point, where they await further switching per routing instruction. CTI enhancement to switch 1021 is provided by a CTI processor 1023 via a CTI link 1024. Processor 1023 is also connected to a local-area-network (LAN) 1057 within call center 1019, and via a link 1055, through a CTI-adapter, to a router 1027 further described below. CTI processor 1023 is adapted, in this embodiment, to control both COST-related hardware and DNT-related hardware implemented within call center 1019 with regards to routing execution of communication events as well as other control functions such as requesting additional information from other sources, and the like.

An interactive voice response (IVR) unit 1022 is connected to switching apparatus 1021 in a manner that COST calls may be switched to the IVR, and unit 1022 is also connected to LAN 1057 by which interaction with CTI processor 1023 may be achieved. IVR 1022 is adapted to handle incoming cost calls from switch 1021 that are not immediately routed to an agent. An internal telephone wiring system 1028 links individual agent's telephones to switch 1021.

CTI Processor 1023 is adapted, as one of many CTI applications it may provide, to creating and queuing electronic records representing client's COST calls, including retrieving and recording associated information related to the call. Provision may also be made in some embodiments for converting a connected COST call to a DNT call that may be routed over LAN 57 to a connected agent, to be processes by an agent's computer station having a video display unit (PC/VDU) using suitable software. This conversion function, if used, may reside in switching apparatus 1021, or be adapted to the system in another way. In preferred embodiments CTI processor 1023 also assigns priority to incoming calls based on predetermined rules.

In the present example, as shown in FIG. 7, there are five agent stations which share LAN 1057. These are agent stations 1045, 1033, 1031, 1047, and 1049. Two of the five agent stations, namely, stations 1033 and 1031 are shown in expanded view illustrating network and switch-connected components such as agent's telephones 1035 and 1037, and agent's PC/VDUs 1039 and 1041. It will be apparent to one with skill in the art that there may be many more than five agent stations within call center 19 without departing from the spirit and scope of the present invention, however, the inventor has deemed the illustration of five stations as shown herein to be adequate for the purpose of properly explaining the dynamics of the present invention. Further, some stations may be equipped for special functions, such as monitoring and supervision and the like.

Agents working within call center 1019 are telephone-connected to switching apparatus 1021 via wiring 1028 from the switch to each of agent's telephones such as telephone 1035. LAN access for each agent is provided through the agent's PC/VDU such as PC/VDU 1041. In this way agents may receive DNT and COST calls at their respective stations. Also connected to LAN 1057 is a database/information server 1043 and a statistical server (Stat-Server) 1051.

Server 1043 in many embodiments records information related to clients, such as purchase history, shipping information, preferences, and other such parameters. Server 1043 may also contain product information, inventory reports, etc. STAT server 1051 records statistical information regarding agent history and performance including all customer transactions and dispositions as well as agent skill levels and agent status in real time. In this way, intelligent routing routines may rely upon up-to-date information regarding agent overall status and history for use in predictive routing.

It will be apparent to one with skill in the art that there may be several separate servers having dedicated functions connected to LAN 1057 without departing from the spirit and scope of the present invention. The inventor has chosen to illustrate separate functions within a few connected servers such as servers 1043, 1051, and 1023. It will be appreciated that the routing software and other control routines for intelligent routing will generally be implemented within processor 1023. However, servers 1043 and 1051, as well as other dedicated servers or routers (not shown) that may be connected to LAN 1057 may also execute routing routines. The embodiment shown here is but one example of many possible implementations.

In the example shown DNT communication via Internet 1015 enters multimedia server 1027 within call center 1019. Multimedia server 1027 in this embodiment is an E-mail server, as in related case Ser. No. 08/795,680, that has been further improved and adapted to accept electronic faxes, video-mail, DNT calls and the like. An IVR unit 1025 adapted to handle live DNT calls and programmed to interact with callers is connected to multimedia server 1027, and performs essentially the same functions for DNT calls (in this case IPNT calls), that are performed by IVR server 1022 for COST calls. Multimedia-to-CTI adapter 1026 is provided for the purpose of converting incoming multimedia communications into a record format that is transportable via LAN and may be understood by LAN-connected devices. In this way, all communication requests along with attached information may be routed via a single set of routing rules.

Unique software of the present invention creates a prioritized multimedia-queue (M-Queue) 1036 similar in many respects to the intelligent queue described with reference to co-pending patent application Ser. No. 09/024,933 wherein live and virtual communications may be prioritized and represented while awaiting further routing instruction. M-Queue 1036 has all of the attributes of the queue of case Ser. No. 09/024,933 with the added adaptation that enables storing and processing records of all forms of multimedia communication, including DNT and COST calls. A prioritized multimedia-queue application for a queue such as queue 1036 may reside in CTI processor 1023, or in a separate LAN connected device. In some embodiments of the present invention, there may be more than one queue established by the software of the invention with each queue dedicated to different forms of communication and prioritized according to pre-set rules. However, due to an innovative technique of the present invention wherein any communication may be represented by a LAN-transportable virtual-communication record, one queue is all that is required.

In the case of a COST call, and in the event of heavy call loading, calls are routed to IVR 1022. IVR 1022 may inform the caller regarding the estimated time before an agent will be available and ask if the caller would rather leave a voice-mail message instead of waiting. If the caller leaves a message, it is prioritized and made of record as a virtual call and routed by CTI processor 1023 taking it's place in queue according to pre-set criteria.

When the record of the voice-mail reaches the head of the queue, it is routed to the next best available agent utilizing all of the sophisticated routing protocol most often reserved for live calls, including the retrieval and inclusion of any relevant information associated with the record. The agent receiving the record initiates a response action based on the content of the record. For example, if the voice-mail requests a call-back, the agent may initiate the call, or transfer the request to an automated outbound dialing queue, including instruction provided by the caller as to time to call and the like. In one embodiment, automatic outbound dialing would be the routing destination for the record instead of the agent. In this way, the client may be called and connected to the agent with a high priority so as to insure connection.

In an alternative embodiment the IVR informs the caller of the wait time, and offers the caller an option of being called back at a time close to the wait time, and being placed back in the queue at the point where the call would be if placed in the queue originally. For example, in this embodiment, if the wait time in the queue is ten minutes, the IVR may schedule a call-back to the customer in 9 minutes and 45 seconds, and queue the call-back in an outbound dialer, which will make the call at the appointed time. After making connection with the customer again, the system places the new call in the queue at or near the head of the queue, so the live call will then be connected to an appropriate agent very quickly. By this method callers may be assured of being serviced in the time given as a wait time, alleviating any incredulity or mistrust, and establishing good will for the host of the call center.

In the case of a live DNT call, IVR 1025 informs the client of the estimated waiting period before an agent will be available to answer the DNT call. An electronic voice message may be left by the customer, stored and routed in the same manner as virtual calls representing COST calls, as described immediately above. Multimedia-to-CTI adapter 1026 makes record of and prioritizes the message for placement in queue 1036 according to pre-set rules. Again, when the record advances to the head of the queue, it is routed to a next best agent over LAN 1057. The agent receiving the record may initiate the requested response.

In the event that a caller, informed of delay by an IVR, elects to wait for an agent, then the record will indicate a live call waiting either at switch 1021 (COST call) or at multimedia server 1027 (DNT call). The virtual-queuing function may operate as the default mode, or be set to become operative during times of need such as peak-load hours.

Prioritizing communications may depend only on the type of media used. For example, live calls may be identified to assume highest priority while faxes assume the lowest priority. Priority may also be established according to additional customer information that may be retrieved from database 1043. For example, an E-mail from a company's largest buyer will be assigned a higher priority than a voice-mail from a smaller buyer, and so on. A parser tool may also be used to review certain types of messages, such as E-mail or faxes, in order to assign priority based on content of the message.

IVRs such as IVR 1022 or 1025, in addition to offering voice-messaging, may also offer a series of generic automated responses such as fax-backs or E-mails containing standard information. In this case, the record would automatically be routed to such automated services transparent to the agent.

As previously described in co-pending patent application Ser. No. 09/024,933, a virtual queue is provided wherein callers may disconnect from the call center after being queued without losing their place in the queue. When their virtual call reaches the head of the queue the client is called back and connected to a next best available agent to handle the call.

In co-pending case Ser. No. 09/024,825, a queue is provided that allows calls to be prioritized and sequentially stacked so that the highest priority calls are routed first according to existing routing rules. As described in numerous examples in the specification of that prior application, the prioritizing technique can be used with virtually any type of routable communication such as E-mail, V-mail, faxes, Internet protocol (IP) calls, and so on. However, different forms of communication would be handled separately (different queues), with live callers required to remain connected to the call center until their call is answered.

An object of the present invention is to combine the innovative aspects and technology found in the above described cases and further improve the combination to obtain the queuing system of the present invention.

Figure 8:
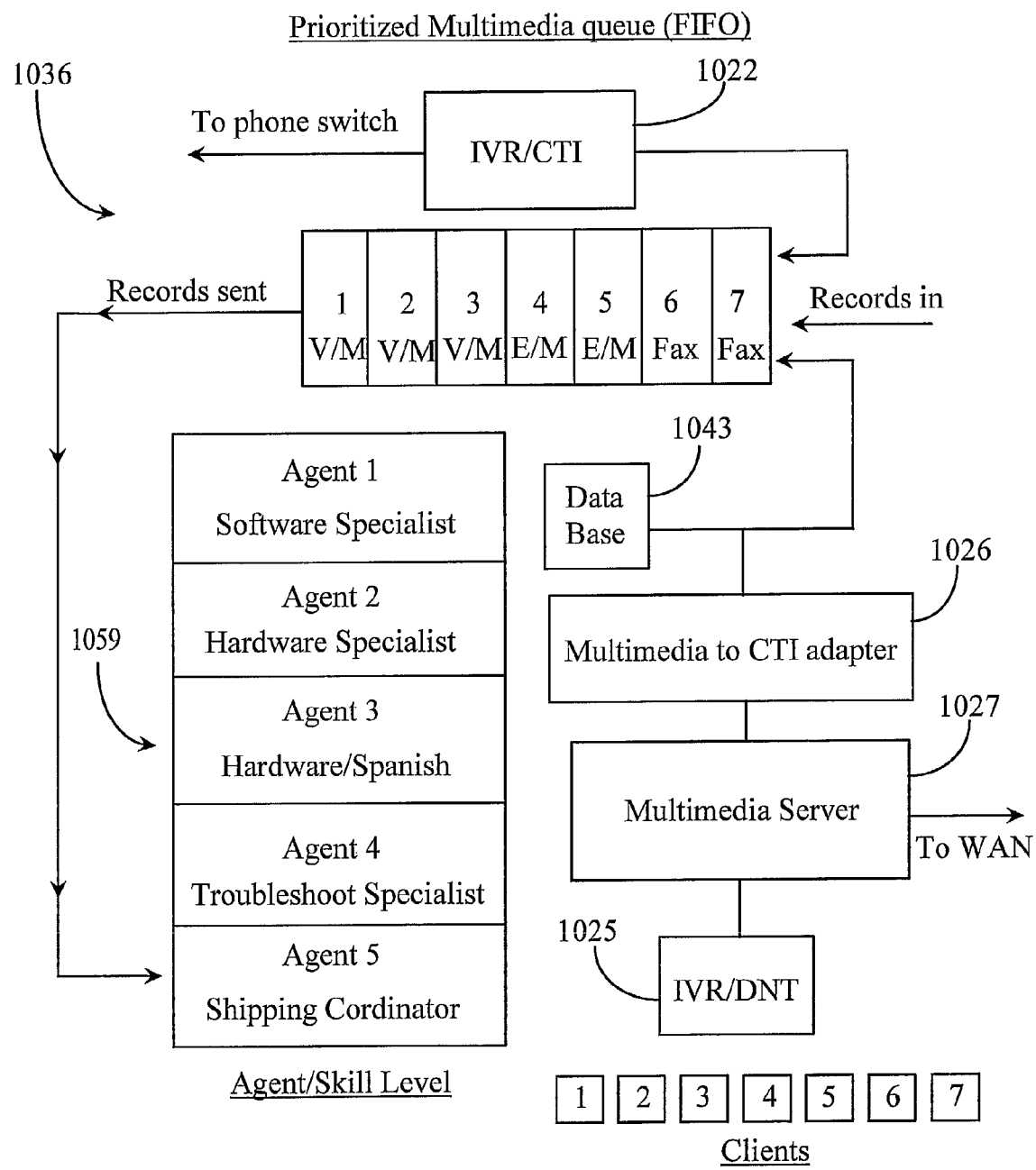
FIG. 8 is a block diagram illustrating a multimedia queue according to an embodiment of the present invention.

FIG. 8 is a block diagram illustrating a multimedia queue according to an embodiment of the present invention. Queue 1036 is a virtual queue wherein all communications may be represented by records, and wherein live callers may disconnect and be called back without losing their place in the queue. In addition to live calls (both COST and DNT), E-mails, video-mails, voice mails, faxes, and the like may be made record of and placed in queue 1036. The record created for each type of communication is standardized with respect to format for the purpose of universal understanding by LAN-connected devices such as PC/VDUs operated by the agents. With respect to live calls as described above, a client placing a live call may elect to hold with the record so designating. A client electing not to hold may instead place a voice mail, perhaps requesting a call-back with the record so designating.

An innovation inherent to the present invention is a fact that each record representing a type of communication may be routed according to existing routing rules such as skill-based and predictive rules. A further innovation inherent to the present invention allows for prioritizing the records in a combined fashion using a single set of rules. Record priority bumping may take place in the queue regardless of communication type.

Some attributes used in multimedia are not generally compatible with telephony-based LAN-connected storage and routing services such as with E-mails for example. An E-mails reply address may not be recognizable to a LAN connected storage device or to routing software that is generally used for the routing of telephone calls. This condition is described with reference to co-pending application Ser. No. 08/795,680. For this reason, a multimedia-to-CTI adapter 1026 is used to convert such attributes to a format that can be easily understood by routing and storage software. After the proper formatting is performed in adapter 1026, then the record is created and prioritized. Actual multimedia communications may be stored in a separate dedicated LAN-connected server or servers. Multimedia to CTI adapter 1026 is equipped to retrieve information from other sources on the LAN much the same way as IVR 1022.

Yet a further innovation allows the actual multimedia message such as a voice mail to be routed in unison or in parallel with the record. More specifically, the actual media is retrieved and routed based on the direction of the record. Multimedia-to-CTI adapter 1026 formats all media that is not a live call for transport over the LAN to connected devices and systems. The agent may receive a notice of the record and then retrieve the media, or the media can be routed to the agent based on the record.

Referring now to FIG. 8, there are 7 records 1-7 representing various forms of communication placed in queue 1036. In this embodiment, the records are prioritized according to media type. For example, records 1 and 2 are live calls (one is a COST call and the other a DNT call, although this distinction is not shown in the figure), record 3 represents a voice mail left by a live caller who has elected to disconnect from the call center during the waiting period associated with queue 1036. Records 4 and 5 represent E-mails, while records 6 and 7 represent faxes. One can appreciate that they are stacked according to assigned priority.

It will be apparent to one with skill in the art that queue 1036 may contain many more records of communication than are illustrated here, however, the inventor has deemed 7 such records sufficient for the purpose of adequately describing the present invention. It will also be apparent to one with skill in the art that there are many possible priority rules that may be implemented and applied to queue 1036 without departing from the spirit and scope of the present invention. The example illustrated herein is but one of those many possibilities.

Because the records are universally understandable to LAN-connected devices and intelligent routing software, they may be stored in a single general queue as shown here. However, separate queues may be used if desired without departing from the spirit and scope of the present invention. Such a case may be if facilities or departments responding to the records are divided by media type and separated geographically.

A group of agents 1059 represents the agents of FIG. 7 residing at agent stations 1045, 1033, 1031, 1047, and 1049. Each agent in group 1059 has a specific skill set, although an indication of each set is not indicated in the figure. For example, agent 1 is a software specialist. Agent 2 is a hardware specialist while agent 3 is a hardware specialist who also speaks fluent Spanish. Agent 4 is a troubleshooting specialist. Agent 5 is a shipping coordinator.

As previously described, records 1-3 are voice mails that were left after clients placing COST calls were prompted via IVR 1022. IVR 1022 is multi-taskable meaning that it may interact simultaneously with a number of clients according to a number of different criteria. For example, voice recognition may be used to determine the original nature of a call. Touch tone techniques may then be employed to offer the client an option of perhaps leaving a voice mail or receiving an automated fax or E-mail.

In one embodiment, IVR 1022 is enhanced with outbound dialing capability (or interfaced with an outbound dialer) so that if a client requests a call back, his record may queued in an outbound queue. When his or her record advances to the head of the queue, the outbound dialer will place the call to the destination number of the client and connect the client to an available agent when he or she answers the call. Such outbound calls may be given priority over normal incoming calls so that requeuing would not be required.

Other automated services may be provided by the call center such as automated faxes, E-mails, voice messages and the like. In these cases, IVRs 1022 and 1025 would offer the services as an option. If the client only seeks information and does not require a live agent, he or she may well select an automated response. In this case, the record would be routed to the appropriate automated system to prepare and send the information according to the media type selected. In this way, agents may be kept busy answering calls and responding to other communications that actually require their attention.

CTI server 1023 creates digital records of COST calls according to customer preference with regard to available options, and assigns a priority for each record. One function of the innovative software allows retrieval of stored information regarding the client in order to aid the prioritizing process. The actual recorded voice mail may be stored in a separate multimedia database such as database 1043 of FIG. 1. When the record is routed to an available agent, the actual voice-mail may be retrieved by the agent, or may be routed in unison with the corresponding record.

In this embodiment, record 1 is a live call from a client seeking particulars of a recently shipped order. Therefore, when this call reaches the head of the queue it is routed to agent 5 who is the shipping coordinator. Record 2 in this example is from a Spanish-speaking client with a hardware problem to solve. When record 2 advances to the head of the queue it will be routed to agent 3 who handles hardware and speaks Spanish. All records are so routed unless they are destined for automated services as previously described.

Multimedia server 1027 receives communications from clients by way of a WAN such as Internet 1015 of FIG. 7. It will be appreciated that live communication as well as E-mails, Video mails, file transfers, and the like may enter multimedia server 1027. IVR 1025 (a digital equivalent to IVR 22) intercepts live communications such as a DNT call. The same services may be offered to a client by IVR 1025 as described with reference to IVR 1022 as well as allowing the client to leave a voice-mail message, which may be recorded and routed.

In one embodiment of the present invention, separate servers may be used for separate media forms such as a fax server for faxes, an E-mail server for E-mails, a digital server for Video-mails and other audio-visual media, and so on. However, in a preferred embodiment, one digital storage facility/server may be used. COST clients may leave voice messages by phone that are then digitized and stored with other multimedia communications. In this way, a COST client requesting a call back on the telephone may have his voice mail accessed via the agent's PC/VDU instead of from a traditional voice mail box.

Referring again to FIG. 8, records one through 7 have been created, prioritized and queued in queue 1036. If a record 8 is now created and enters queue 1036, it may be assigned a higher priority than records already entered. For example, record 8 may be a video-mail from a client known to be the largest single buyer of the company's products or services. In this case, record 8 would perhaps bump record 1 thereby being the next record at the head of the queue.

In one embodiment, wherein such a VIP client has placed a live call, then immediate routing may take place bypassing the queue altogether. When an agent receives notification of such a call, a current transaction engaged in by the agent may be terminated to free the agent for the call and so on. In another embodiment, IVR 1022 (if a COST call) or IVR 1025 (if a DNT call) may, through accessing stored records, assign a highest priority in queue 1036 including welcoming the client by name and assuring him or her that there is no need to disconnect as the call will move immediately to the head of the queue. Such a personal feature may help companies to secure high value clients.

It will be apparent to one with skill in the art that different types of companies will vary in the way they set routing and priority rules with regards to queue 1036. It will also be apparent to one with skill in the art that companies hosting call centers that do not engage in one or more forms of communication covered in this specification may still practice the present invention with communication media that is practiced. The method and apparatus may be implemented in a COST-call center, a DNT-only call center, or in a combination CTI/DNT call center as taught herein without departing from the spirit and scope of the present invention.

Intelligent routing implementations such as predictive routing, skill-based routing, statistical routing, and other types of intelligent implementations can now be performed with all media types using a single set of rules. There are many possible implementations some of which have already been described. The spirit and scope of the present invention is limited only by the claims.

Internet Call Waiting

In various embodiments of the present invention, described in enabling detail below, a telephony system is provided wherein, during the time a client is connected to the Internet, a unique call-waiting system is enabled. The unique call-waiting system alerts the client by audio and/or video display at the client's Internet-connected computer when a PSTN call is waiting. Facility is provided wherein the client can choose to connect to a waiting call, whereby the selected call is connected to the client's computer over the Internet connection as an IP call. In some embodiments facility is also provided for alerting a client to multiple calls waiting, and the client is enabled to refuse calls, connect to calls, or connect and return an automatic pre-recorded announcement. In various embodiments of the invention the client's connection status is maintained in various ways, described below in enabling detail.

Figure 9:
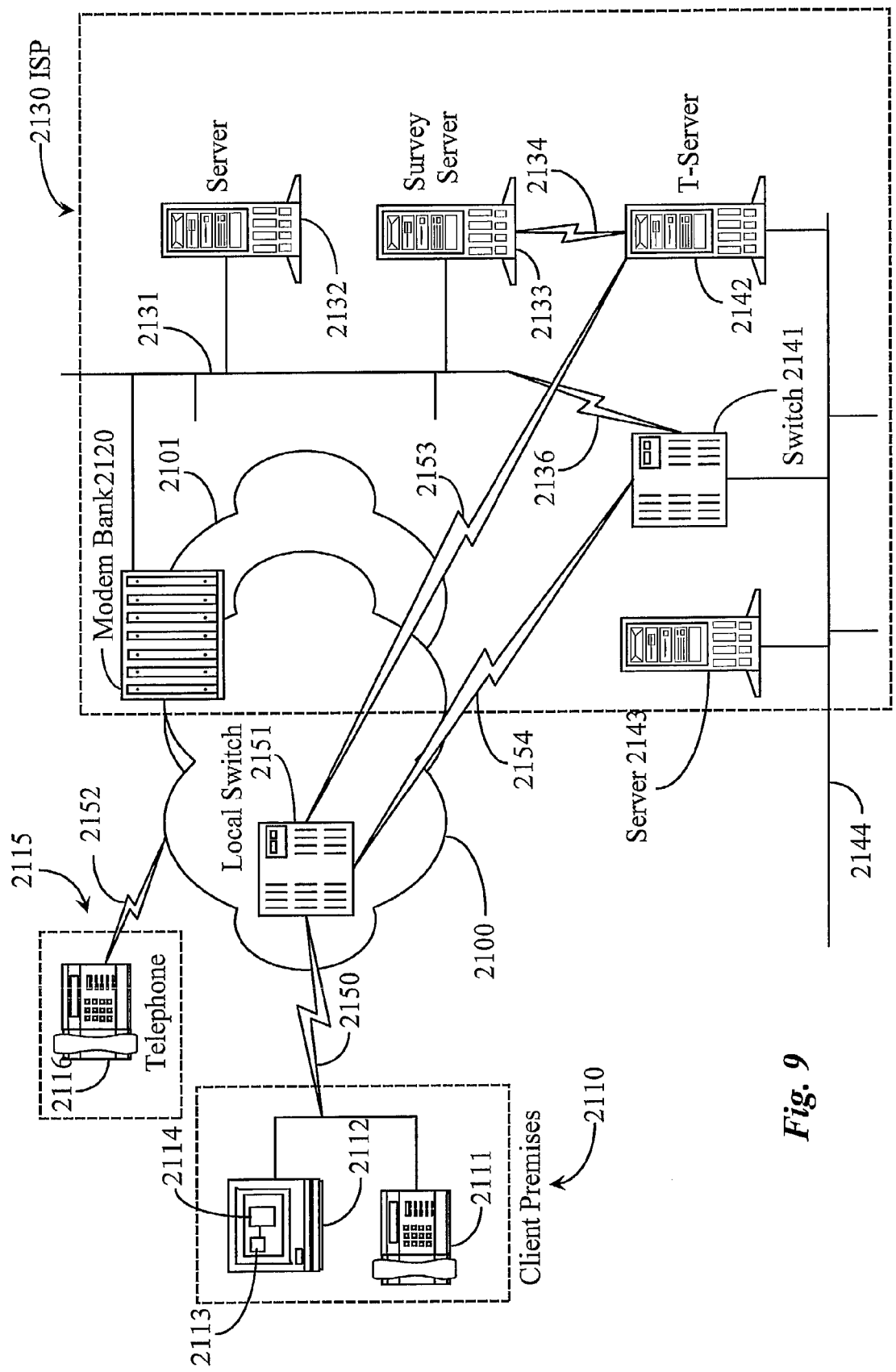
FIG. 9 is a simplified overview of a telephony system according to an embodiment of the present invention.

FIG. 9 is a simplified overview of a telephony-communication network and system according to an embodiment of the present invention, wherein PSTN telephone calls placed to a client's telephone number cause an alert to be sent to the client via the client's Internet-connected computer, and accepted calls may be converted to IP calls and connected to the client without interruption of an ongoing Internet session. In this specification the term client is used to mean any person to whom the services of the invention are provided in practicing the invention in any embodiment.

The inventor in the following disclosure teaches several embodiments of the invention wherein PSTN calls may be routed to a client having an ongoing Internet session and Internet telephone capability, after first alerting the client to the call or calls waiting. It will be apparent to the skilled artisan that the embodiments described below are examples of practice of the invention, and are not meant to be limiting. There are other possible alterations that may be made within the scope of the invention.

In the system of FIG. 9 a client premises 2110 comprises a telephone 2111 and a personal computer 2112 sharing a telephone line and linked to a telephony switch 2151 in public-switched telephone network (PSTN) 2100 via a line 2150. Telephony line 2150 may be of the form of analog connection, digital and analog connection such as ISDN, or any other line type deemed appropriate to carry both digital data and analog data. Telephony switch 2151 is exemplary of switches in the PSTN, and via switch 2151 the client may place telephone calls via telephone 2111 to virtually anywhere on the planet, and may also connect through the PSTN and an Internet Service Provider's (ISP) modem bank 2120 to the Internet network, indicated by network cloud 2101. Once connected to the ISP and logged on, the client can browse the Internet, connecting to a multitude of servers also connected to the Internet network. In embodiments of the present invention, the client at premises 2110 will be logged onto the Internet as described immediately above.

In one embodiment of the present invention, a person at a premises 2115 having a telephone 2116 places a PSTN call to the client at station 2110 using the telephone 2116 connected to PSTN 2100 via line 2152. Caller 2115 may or may not have a PC or an Internet connection. To clearly illustrate the present invention it is intended, for purposes of this example, that the person at premises 2115 has no PC and is not connected to the Internet.

In one embodiment of the present invention, when a client places a call to log onto the Internet via his Internet Service Provider (ISP), a pre-defined forwarding number is programmed into telephony switch 2151 using the Centrex functions of the switch, and the client's call-waiting services (if any) are temporarily discontinued. The necessary commands may be added to the dialing string, for example, that is used by the client's computer to dial-up the ISP. Centrex functions are software functions that are part of a normal telephone service such as call waiting, call forwarding, conference calling, and the like.

The number to which incoming calls for telephone 2111 are forwarded is a destination number associated with a telephony switch 2141. While the client is connected to the ISP, all incoming calls that are designated for the client at station 2110 (telephone 2111) are routed via line 2154 to switch 2141.

Telephony switch 2141 has an IP telephony interface, that is, the switch is adapted to convert incoming calls for telephone 2111 into digital Internet protocol telephone calls using a Transfer Control Protocol/Internet Protocol (TCP/IP) format and connection 2136, and routing the data to the Internet. TCP/IP is a standard communication protocol that is well known in the art and utilized in much computer integrated communication with the Internet. In some embodiments the necessary hardware and software interface to do the call conversion may be integrated with telephony switch 2141. In other embodiments there may be external equipment connected to switch 2141 and to link 2136.

At telephony switch 2141 the conversion is made and the call is routed through TCP/IP link 2136 to an Internet sub-net 2131 hosted by ISP 2130. Now converted to one of several Internet formats (actual format depends on the client's Internet phone application (IPA) 2113), the call can be received by customer 2110 in the form of an Internet phone call to PC 2112 running an instance of an IPA 2113.

To process incoming calls it is necessary that switch 2141, or a processor connected to the switch, have a look-up table or other means for associating client's with IP numbers. The association is made during setup. The association can be made from destination number data arriving at switch 2141 with a forwarded call. When a forwarded call is received at switch 2141, an association is made to the client, the client's IP address is retrieved, and the call is forwarded to sub-net 2131 as a IP telephone call. In many cases, clients will not have a permanent IP address, as the IP address for many services is assigned anew each time the client logs on. In this case, the IP address is retrieved from the client's ISP 2130, or from the client's IPA 2113. It will be apparent to those with skill in the art how this may be done in many ways.

In another aspect of the invention the client's computer station is adapted to deal with incoming calls in a variety of ways. This adaptation is accomplished through software, such as by a plug-in operating in concert with the client's WEB browser. An important function of this application is to alert the client to a waiting call, because the call alert is now coming on the Internet connection and not on telephone 2111. In a preferred embodiment, when an incoming call is received at switch 2141 an alert signal is sent over the Internet to the client at computer station 2112, and the signal initiates an alert action at the client's computer. The client's software may display a telephone icon, for example, on the video display of the computer, and the alert signal may result in an audio "ringing" accomplished through the multimedia abilities of the client's computer, together with a visual effect, such as the telephone vibrating on the screen. Also in a preferred embodiment caller ID information may arrive with the alert signal, and cause the caller's ID to be displayed in conjunction with the audio/visual alert.

In a preferred embodiment the client may respond to the audio/visual alert in a number of ways. Firstly, the client may elect to accept the call, which action may be predicated in any number of ways known in the art, such as double-clicking the alert icon. When the client accepts the call, the system completes the IP call to the client via link 2136, sub-net 2131, and the client's Internet connection.

In alternative embodiments, additional functionality may be built in to the client's application, such as an ability to handle more than one call at a time, presenting the client with separate icons or other indicia for each call, including caller ID. The client may select to return pre-recorded messages as well, such as "Thank you for the call. I'm on an Internet session. Please call back after 4:00 PM." In another alternative the client may select to take the call as a PSTN call, and end the Internet session, at which time the system forwards the call to the client as a PSTN call to telephone 2111. In yet another embodiment of the invention the client may elect to continue the Internet session, but to have the incoming call forwarded to a conventional (not Internet protocol) telephone number, such as a cellular telephone which the client may have nearby, or another telephone set in the same premises. In this embodiment the system is adapted to redirect the incoming call according to the recipient's selection. In this embodiment the client mat set his/her routing rules in subscribing to the service to have incoming calls during browsing sessions redirected to a cell phone number, an alternate telephone at or near his/her premises, or to some other destination. Alternatively the client may select a forwarding after being alerted to an incoming call.

In embodiments of the invention switch 2141 and associated equipment along with a subscription service allowing client's to register and provide the necessary information to use the service (telephone number, IP address, etc.), may be implemented in a number of ways. For example, this equipment and service may be provided by an Internet Service Provider, such as ISP 2130, as shown in FIG. 9, or may be provided by, for example, a local telephone company.

In an alternative embodiment of the present invention, initiation of service through switch 2141 is accomplished through ISP 2130, rather than by call forwarding via the Centrex functions of a PSTN switch, as in the first embodiment described above. Referring again to FIG. 9, in this alternative embodiment, at the time of Internet connection, using an amended log-in procedure for subscribers to the service, a command is sent from modem bank 2120 associated with ISP 2130 to a telephone-survey server 2133 connected to sub-net 2131 of ISP 2131. Telephone survey server 2133 is a special server hosted by ISP 2130 in this embodiment, and is the repository of the subscriber list, look-up tables for associating subscriber's numbers with IP addresses, and so forth, as described above.

Telephone-survey server 2133 is connected via digital link 2134 to a CTI-server (hereinafter T-Server) 2142. It will be apparent to one with skill in the art that T-server 2142 and telephone-survey server 2133 may be one server capable of the required functions of the present invention. Separate servers are illustrated here for the explicit purpose of describing separate functionality.

T-server 2142 in this embodiment is a CTI-Sever capable of monitoring and directing activities of switch 2141. T-Server 2142 receives direction via link 2134 from telephone-survey server 2133 and directs switch 2141 to initiate a call to the remote access forwarding number of the client, thereby directing forwarding of incoming calls for the client to a number at switch 2141. From this point operation is the same as described above for the first embodiment, with incoming calls being converted at the IP interface associated with switch 2141 to TCP/IP protocol and routed to the client via connection 2136 and ISP 2130.

There are certain advantages to this embodiment made possible by the unique server capability. One advantage is that due to bypassing the Centrex functions of telephony switch 2151 by having the modem bank initiate the forwarding command to T-server 2142, no delay would be experienced by customer 2110 in logging on to the Internet.

Another advantage of a server-controlled environment is that with appropriate software features available with PC 2112 (plug-in 2114), a method is enabled whereby the client at station 2110 can place a call to a person not connected to the Internet such as a friend, or public business, and so on, without disconnecting from the browsing session. To further illustrate, assume that customer 2110 is engaged in a current Internet session with a single line, and has realized that he must place a time-sensitive call to confirm a business appointment. Icons available through his plug-in 2114 could be matched with the conventional telephone number of the person he desires to contact. This can be done either by accessing telephone-survey server 2133 over the Internet and initiating the appropriate configuration of the selected icon to that particular analog number, or by obtaining the desired number from a telephone book and manually configuring it to the selected icon. Instead of dialing the analog number from the single Internet-connected analog telephone as would be required without the appropriate software, customer 2110 double clicks the icon representing the desired contact and Internet phone application 2113 places a digital call through modem bank 2120, sub-net 2131, and TCP/IP link 2136 to telephony switch 2141 where the digital call is converted to analog. Switch 2141 then places the analog call to the desired destination, and performs the two-way conversion required for the on-going call once connection is made. Associated toll charges could be stored on a separate server such as server 2143, and later billed to customer 2110 in a conventional manner such as on his telephone bill.

It will be apparent to one with skill in the art that once connected to an analog phone, continued analog to digital and digital to analog data conversion would be required to maintain dialog in the conversation. A full-duplex sound card will be required on PC 2112 to enable the client at station 2110 to receive and send audio at the same time, avoiding problems such as the need to wait until the incoming transaction is complete before speaking and so on.

In another embodiment of the invention switch 2151 is connected to CTI-server 2142 via a CTI link 2153, (FIG. 1) and T-Server 2142 may thereby monitor and direct activities of switch 251 directly. In this embodiment, when the client at station 2110 logs on to ISP 2130 via modem bank 2120, T-Server 2142 recognizes the activity, and sets up call forwarding of incoming PSTN calls for that client to switch 2141, where such calls are converted and directed via the Internet as described above for the first two embodiments.

In yet another embodiment of the invention, the local telephone company may have a server (not shown) connected to switch 2151 for performing functions according to the present invention. This server could be a CTI-server connected via a CTI link and executing a CTI application, or could be a server of another sort, or the functionality may be integrated with the functions of switch 2151. The special server is Internet-connected, and hosts a WEB page. In this embodiment plug-in 2114 in the client's WEB Browser, after connection is made to the Internet through switch 2151, negotiates with the server through the Internet, which then sets up switch 2151 to redirect incoming calls through the Internet to the client. This embodiment has the advantage of providing all the necessary services at the local PSTN switch hosted by the phone company, and the ISP need not be involved.

It will be apparent to one with skill in the art that the hardware used in various embodiments of the present invention is well known in the art and can be utilized in various ways without departing from the spirit and scope of the invention.

Figure 10:
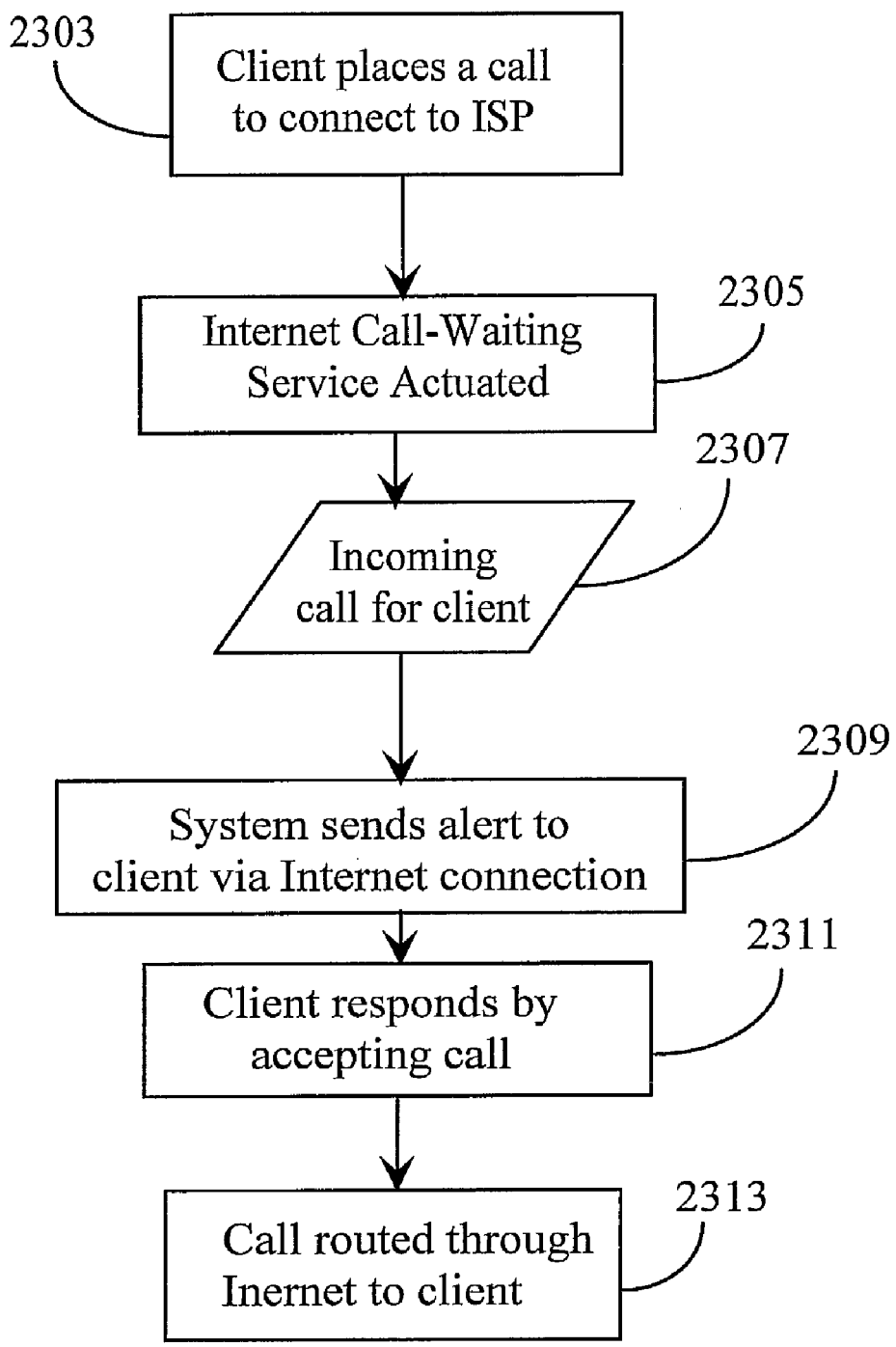
FIG. 10 is a simplified process flow chart illustrating a basic features in an embodiment of the present invention.

In some embodiments of the present invention, any one of several commercially-available Internet telephone software packages may be used FIG. 10 is a process flow chart illustrating various steps in practicing an embodiment of the present invention in a general and broad sense At step 2303 the client places a call to access his/her dialup ISP. The system at step 305 activates Internet call-waiting for that client while the client is connected to the Internet through the ISP.

At step 2307 an incoming call is placed for the client. At step 2309 the system sends an alert to the client via the client's Internet connection that there is a call waiting. At step 2311 the client responds to the alert by accepting the call. At step 2313 the incoming call is routed through the Internet to the client as an Internet phone call.

Interaction of the client's PC to incoming calls, and function of software of the client's PC in practicing the invention in other ways has been described to some extent above. In all cases there needs to be a minimum software ability at the client's station to receive Internet telephone calls, and there are several commercially-available applications for the purpose. Moreover, a plug-in for a client's WEB Browser has been described for providing functionality according to several embodiments of the present invention. Considerably more functionality may be provided in some embodiments than presently available from commercially-available Internet Phone software. The software at the client's PC, for example, may cause icons and windows to be displayed in a graphic user interface (GUI) such that incoming calls may be displayed as icons, labeled as to caller and time, and so on. Functionality may be provided such that selecting an icon may connect the call to the client's speakers and microphone such that a conversation may take place. Other windows and functions may be provided as well, and many will be apparent to those with skill in the art in addition to those that have been herein taught Several embodiments have herein been described for practicing the present invention, and given the teaching herein, more may be apparent to the skilled artisan. Moreover, there are many alterations that might be made in the embodiments described, without departing from the spirit and scope of the invention. There are, for example, many individual preferences in coding software while providing essentially the same functionality. There are also variations in connectivity that might be made and variations in computer platforms provided for accomplishing the ends of the invention, without departing from the spirit and scope of the invention. The breadth of the invention is limited, therefore, only by the language of the claims.

Automated Survey Control Routine in a Call Center Environment

Figure 11:
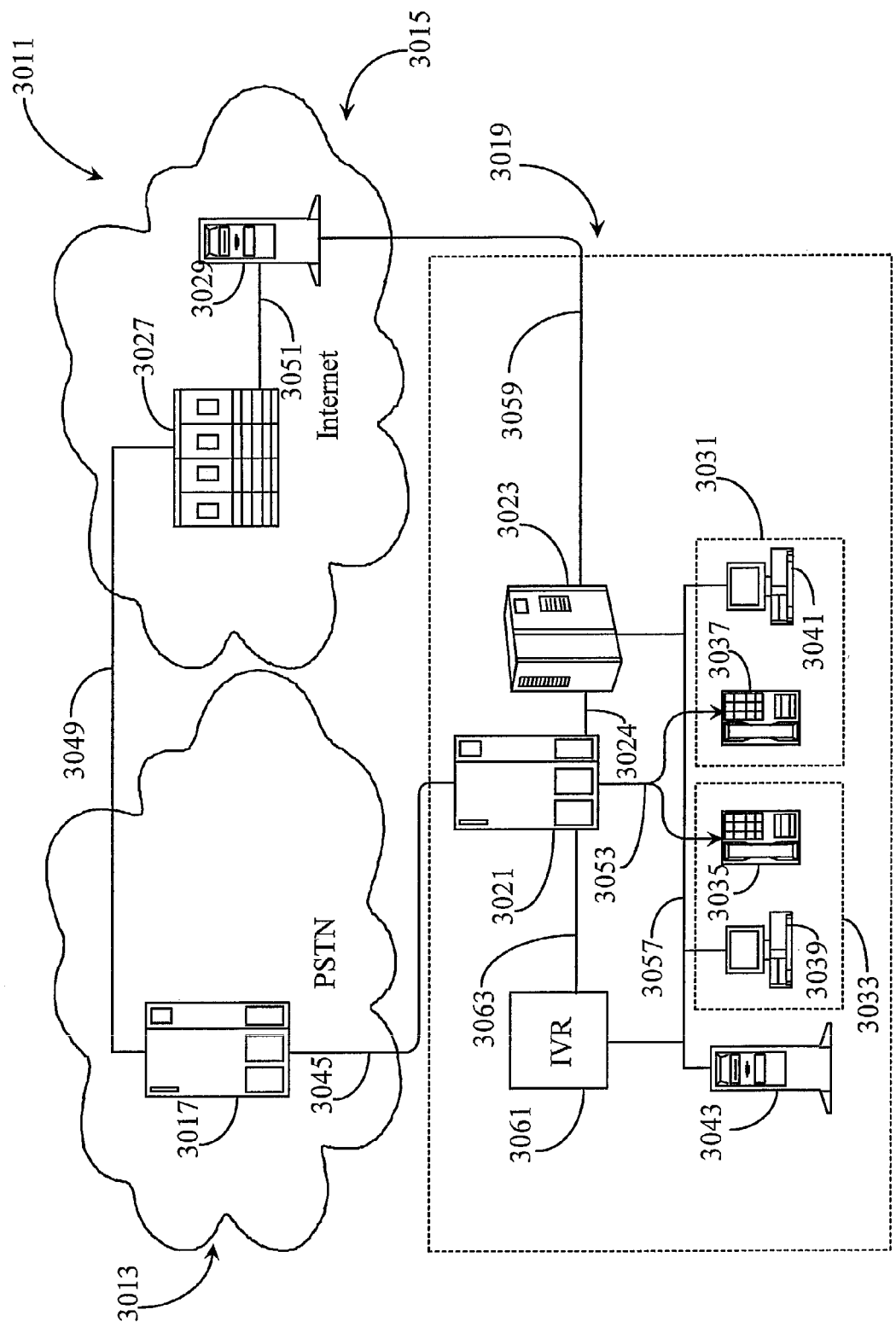
FIG. 11 is an overview of a combined CTI and IPNT call center enhanced with automated survey capabilities according to an embodiment of the present invention.

FIG. 11 is an overview of a combined CTI and IPNT call center enhanced with automated survey capabilities according to an embodiment of the present invention wherein a call-center administrator may select incoming calls via automated routine for the purpose of initiating and completing a customer survey.

Integrated telephony-communications network 3011 comprises a call center 3019 that is linked to both the Internet represented by cloud 3015 and a publicly switched telephone network (PSTN) represented by cloud 3013. Telephony communication systems with Internet connectivity such as system

3011 are becoming more prevalent in the art and are capable of both conventional telephony analog and Internet-based communication. By conventional telephony is meant all of the telephone system infrastructure that is not IPNT.

A single switching apparatus 3017 is shown in PSTN network 3013 to represent all of the apparatus and connecting trunks and such that may be extant in the network.

Switch 3017 is shown connected via trunk 3045 to a telephony switch 3021 within call center 3019. PSTN 3013 may be a private network rather than a public network and Internet 3015 may be of the form of another wide area network (WAN) such as are known in the art.

The embodiment illustrated herein represents just one example of a telephony communications environment that can utilize the method and apparatus of the present invention. Further, the method and apparatus of the present invention can be implemented in a telephony communications system that is not linked to a WAN. In a preferred embodiment, the present invention is utilized with voice calls arriving at a call center such as call center 3019 within the scope of a CTI telephony architecture. However, application of the present invention may also be made to an IPNT system, as briefly noted in the background section and represented here. In this embodiment, call center 3019 may handle calls from the conventional telephone network as well as IPNT calls.

Referring now back to FIG. 11, calls originating from PSTN 3013 are, in this embodiment, routed to switch 3021 in the call center premises. In this embodiment a computer processor 3023 is linked to switch 3021 via a CTI link 3024. CTI processor 3023 provides computer enhancement to call center 3019. Routing protocol and similar control routines such as statistical and skill based routines are stored and executed via processor 3023, which may access other sources of information and data.

CTI processor 3023 is connected to a local area network (LAN) 3057, which also interconnects PCs agent stations within call center 3019 such as an agent station 3031 and an agent station 3033. Agent station 3031 comprises an agent's telephone 3037 and an agent's PC 3041. Agent station 3033 comprises an agent's phone 3035 and an agent's PC 3039. Also connected to LAN 3057, there is a customer information system (CIS) data server 3043 and an interactive voice response (IVR) unit 3061. IVR 3061 is connected to telephony switch 3021 via link 3063. CIS data server 3043 may contain information regarding customers such as history, preferences, order information, and the like. IVR unit 3061 includes software and typically digitally recorded messages needed to interact with callers who may be routed to the IVR instead of to live agent.

IVR 3061 is multi-taskable meaning that it can interact with callers according to a number of differing criteria. For example, information may be obtained by callers via interactive exchange as well as information being made available to the call center via the same method. Interactive exchange between an IVR such as IVR 3061 and a client typically involves voice recognition technology. However, other methods known in the art such as touch tone response may also be employed.

Processor 3023 in this embodiment is shown linked to Internet server 309 via a TCP/IP connection 3059. In other embodiments the Internet access may be through another server on the LAN accessible to processor 3023. Internet server 3029 is accessible to agents from PCs on LAN 3057 through processor 3023 and digital connection 3059. Switch 3017 in PSTN 3013 is shown connected to an Internet Service Provider (ISP) 3027 via line 3049. The Internet connectivity, as illustrated within this embodiment, is meant to show only that Internet-based communication as well as conventional telephony communication is provided for call center 3019, and that aspects of the present invention may be applied to both mediums. WAN access such as access to Internet 3015 may be of the form of a dial-up connection or a connection that remains open so that agent's PC's such as agent's PC 3041 and agent's PC 3039 are continually connected to Internet 3015 while they are logged-in to telephony-communications network 3011.

In an embodiment of the present invention a software routine enables a call-center administrator, manager or other responsible party to select incoming calls at telephony switch 3021 within call center 3019, based upon a percentage or random method, for the purpose of initiating a "post call" survey with the selected client-callers. For example, selected calls, prior to being routed to an agent for normal business, are routed to either IVR 3061 or a live agent such as an agent at agent station 3033. In either case, permission is first elicited from the client-caller to participate in the survey. If a selected caller agrees to participate in the survey, he/she is requested not to discuss the fact of the survey with any agent to whom the call may be routed, and to hold, rather than hang up, after the transaction with the agent is complete so that the caller may be transferred back to IVR 3061, or in some embodiments, to a survey agent responsible for conducting the survey. In the case of a live agent conducting the survey, any eligible trained agent or agent supervisor who is not a subject of the survey himself may be used, at any agent station. It will be apparent to those with skill in the art that there will typically be many more agent stations than the two stations 3031 and 3033 shown in FIG. 11. In this embodiment there are only two agent stations shown, agent station 3033 and agent station 3031.

The software according to an embodiment of the present invention may execute on processor 3023 or another processor linked to LAN 3057 and linked to telephony switch 3021. In various embodiments, call selection and survey participation may be either partly or wholly automated. For example, in a completely automated instance, a particular group of agents within call center 3019 may be designated to be subjects of the survey. Either part of or all of the incoming calls routed to that particular group of agents could be automatically selected and routed to an IVR such as IVR 3061. IVR 3061, in this case, automatically solicits customer permission to conduct the survey. Willing customers are automatically transferred (after their session with a target agent) to the same or another IVR to participate in the survey. After the interactive survey is performed, the call is terminated and the information cached for later review. In a partially automated instance, call selection and the solicitation of customer permission could be automated while the survey may be conducted by a live agent or agents.

It will be apparent to one with skill in the art that there may be more than one IVR such as IVR 3061 connected to LAN 3057 without departing from the spirit and scope of the present invention. For example IVR 3061 may be used for asking permission from a caller to conduct a survey, and another IVR may be used to actually conduct the survey, and so on. It will also be apparent to one with skill in the art that there may be more than two agent stations such as agent stations 3033 and 3031 without departing from the spirit and scope of the present invention. In actual practice, many agents could be the subject of surveys during any given time period while many other agents may be conducting surveys, and so on.

In an embodiment wherein IPNT calls are accepted from Internet cloud 3015, incoming calls would also be selected from a general queue or routing point. Such a routing point or "virtual destination" could be implemented in processor 3023, or in a LAN accessible and Internet-connected file server such as file server 3029. In this embodiment it is assumed that IPNT calls are received at a routing point and intelligently routed to agents best suited to handle the calls, just as is accomplished for plain old telephony service (POTS) calls.

In this case an IVR is implemented to operate in Internet Protocol. Selected calls are routed to the IPNT IVR for the solicitation of permission for participation, just is the previously described case. In some instances the IVR for both POTS calls and IPNT calls could be the same IVR (3061). From IVR 3061 willing IP calls are routed to the PCs of target agents while non-willing IP callers are routed to regular agents who are not the subject of the survey. After agent contact has transpired, willing IP callers are either re-queued in IVR 3061 to participate in the survey or routed to a survey agent's PC to participate in the survey.

In some embodiments, an IVR such as IVR 61 may, as described above, handle IP and POTS calls at the same time, and may also accept overload calls originally destined for live survey agents. Furthermore, live survey agents may be put to work accepting overload calls originally destined for the IVR survey. The method and apparatus of the present invention may be integrated with any number of routing rules.

Figure 12:
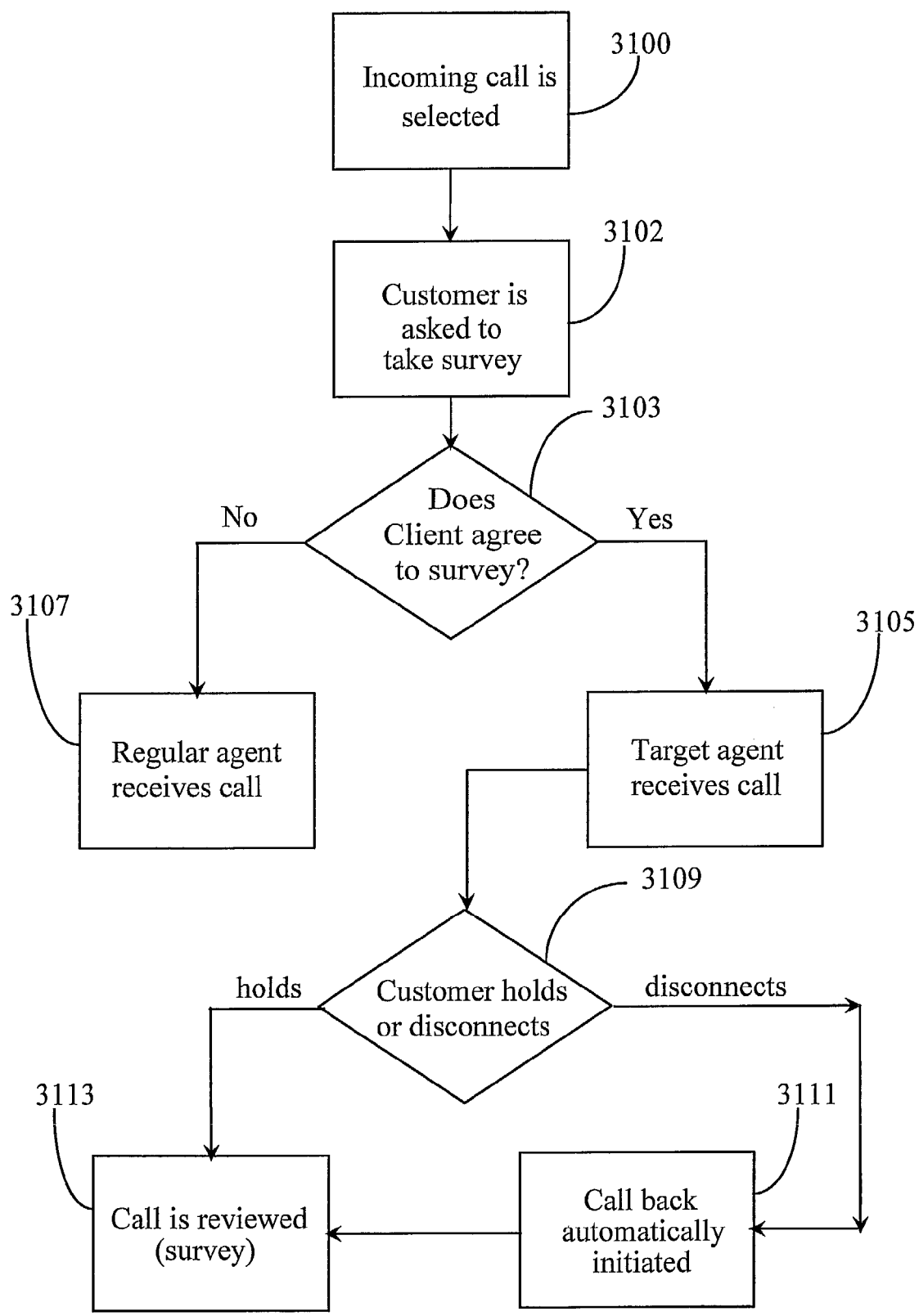
FIG. 12 is a workflow chart illustrating various steps of a survey routine according to an embodiment of the present invention.

FIG. 12 is a workflow chart illustrating steps of a survey routine according to an embodiment of the present invention wherein incoming calls are selected on a percentage basis. In various embodiments of the invention the selection criteria may be altered. For example, in an embodiment as depicted here, wherein calls are selected by percentage, the percentage may be set by an administrator, such as 1%, 5% and so on. In other embodiments, selection criteria might be to ask clients from certain geographical regions to participate. For example, 10% of all callers from Georgia may be selected for a survey for a certain period of time, then 10% of all callers from West Virginia for another period of time. The skilled artisan will appreciate that the selection criteria may be altered very widely.

In step 3100 an incoming call is selected from a queue or virtual destination point, according to established selection criteria. In addition to a percentage, as indicated above, other information may be available for a caller. For example, in many instances preprocessing of calls is done in the network in a Service Control Point (SCP), and in that process a caller may be asked to provide certain information. Additionally, elicited information or available with a call, or a DNIS number (for example) as a key, may be used to retrieve more information on a caller from such as database 3043 (FIG. 11).

At step 3102 a selected caller is asked to take part in a survey. Calls in the survey system are further routed based on this response. For example, if a caller indicates that he/she is not willing to do the survey, then the call is routed to a regular agent. In step 3107 a regular agent that is not part of the survey agent population receives the call and disposes of it according to normal procedure. If however, the caller has indicated in step 3102 that he/she is willing to take part in the survey, then the call is routed in step 3103 to a target agent. A caller agreeing to take the survey is informed in step 3103 (or alternatively in step 3102) not to discuss the fact with a target agent and the caller is asked to hold after the transaction with the agent. In step 3105, an available target agent receives the call.

As previously described with regards to FIG. 11, the survey routine may be wholly or partially automated. For example, step 3102 may be performed via an IVR or other automated interactive means such as an interactive web page (in the case of an IPNT call), or by a live operator or agent. Automation will almost always be the case regarding step 3100 because of the volume of incoming calls that is typical in a large call center. However, in some embodiments, even step 3100 may be performed by a live agent.

After a transaction with a target agent has occurred, the caller/participant will either hold as previously instructed, or may inadvertently terminate the call in step 3109. If a caller holds as instructed, he/she is transferred in step 3109 to either an IVR, a live agent, or an agent supervisor to partake in the survey. In step 3113, the survey is conducted and the call is then terminated. If however, the caller has inadvertently terminated the call because of memory lapse or another interruption, an automated out-dialer may place a call and attempt to reconnect with the caller in step 3111. If reconnection is established, the call is transferred to an IVR or live agent as previously mentioned in step 3113.

A certain number of callers who indicated a willingness to participate in the survey in step 3102 may, for whatever reason, during the process, decide that they are no longer interested in taking the survey. For this reason, an automated reconfirmation may be initiated at step 3111 in the form of automated voice allowing the customer to decline the survey or choose to accept one through the mail, and so on. The out-dialer may be programmed to make an appropriate number of re-tries to the "lost" caller before reporting a failed attempt to re-connect.

It will be apparent to one with skill in the art that the method and apparatus of the present invention may be utilized both with POTS calls and IPNT calls without departing from the spirit and scope of the present invention. For example, a call center equipped with CTI enhancement, wherein agents are connected via a LAN that is also connected through a server to a WAN such as the Internet, and having the appropriate switching, IVR, file server, and software capabilities may handle both analog and IP calls. It may be, as well that a call center may be devoted entirely to IPNT calls, in which case the call center will have agent stations with PCs connected on a LAN to a managing computer, but may not have conventional telephones or telephone switching apparatus such as switch 3021 of FIG. 11.

It will also be apparent to one with skill in the art that the method and apparatus of the present invention may be integrated with known routing logic being used in a given call center such as skill-based logic and the like. There are many possible applications to which the method and apparatus of the present invention may be applied without departing from the spirit and scope of the present invention.

By applying the present invention with full automation, a large number of general surveys may be conducted simultaneously, generating much valuable information. By utilizing human control, more intimate surveys may be conducted, perhaps regarding only a few individuals. Criteria for call selecting may be widely varied according to virtually any logical routing criteria that may be in place. Levels of automation may also vary widely. The spirit and scope of the present invention is limited only by the claims that follow.

Figure 13:
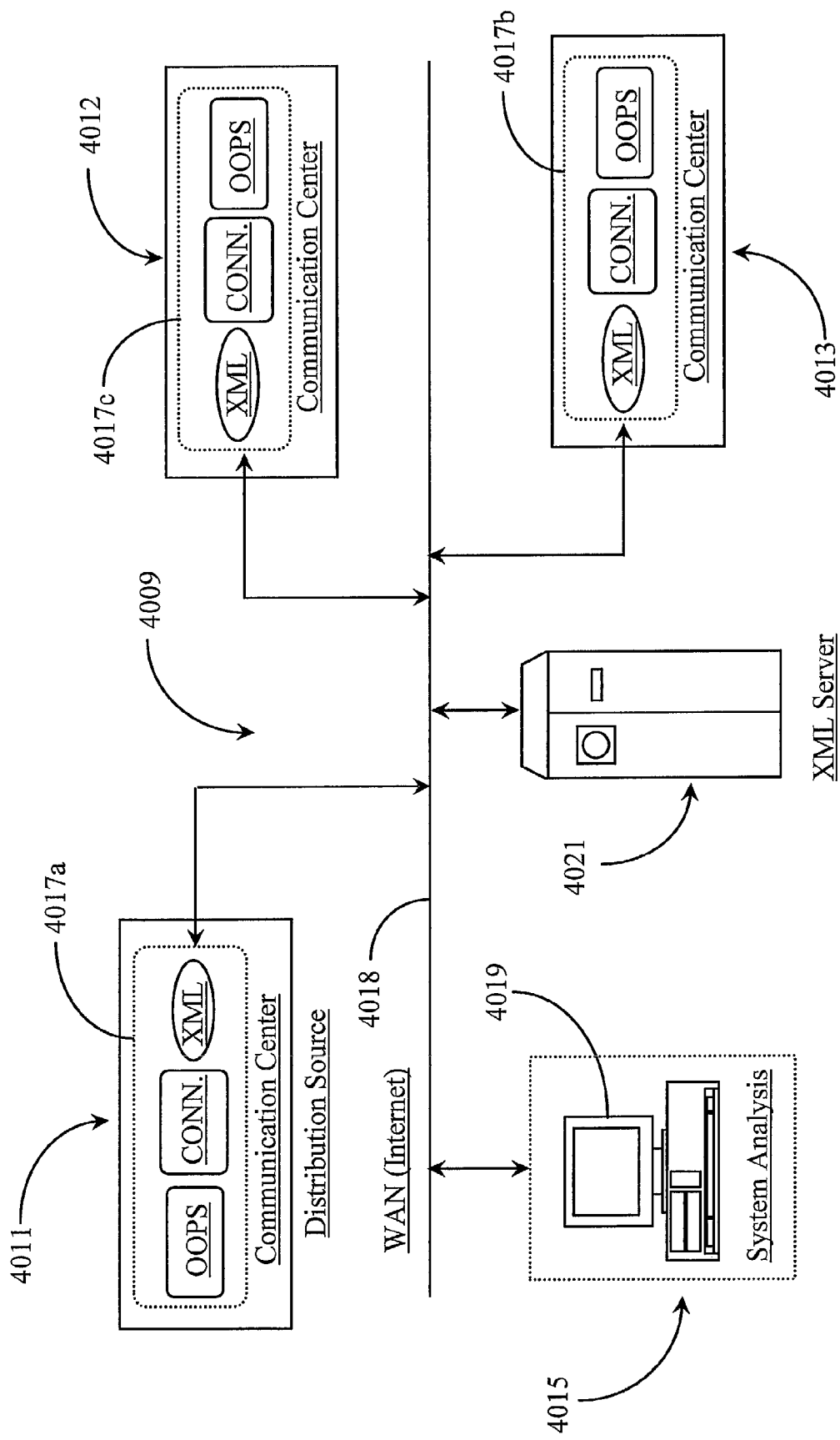
FIG. 13 is a block diagram illustrating a distribution network comprising WAN-connected communication centers practicing a method of application representation and distribution according to an embodiment of the present invention.

Method and Apparatus for Distributing Computer Integrated Telephony (CTI) Scripts using Extensible Mark-up Language (XML) for Mixed Platform Distribution and Third Party Manipulation FIG. 13 is a block diagram illustrating a distribution network 4009 comprising WAN-connected communication centers 4011-4013 practicing a method of CTI application representation and distribution according to an embodiment of the present invention. Network 4009 comprises a Data-Packet-Network (DPN), which is, in this embodiment, the Internet network. Network 4009 may be a WAN other than the Internet as long as appropriate data-transfer-protocols are supported. Examples of applicable WANs other than the Internet would encompass both corporate and private networks. The inventor chooses the Internet network as distribution network 4009 because of its accessibility and because it already supports the data transfer protocols required for practice of the present invention.

Network 4009 is exemplified by an Internet backbone 4018, which represents all of the lines and connection points that make up the Internet network as a whole including connected sub-networks as may be known in the art. Therefore, there is no geographic limit or formal network boundary for practicing the present invention.

In this example, communication centers 4011-4013 are illustrated as having Internet connection to backbone 4018 and therefore included within the scope of distribution network 4009. Internet connection to backbone 4018 may be of any known means including dial-up or continuous connections using appropriate access lines and services. The term communication center replaces the term call center hereinafter in this specification because of expanded multi-media handling performed at such state-of-the-art centers. Communication centers 4011-4013 may be thought of as CTI-enhanced call-in centers with additional capability of handling Internet-sourced or IP telephony calls and other electronic documents. Therefore, each center may be assumed to contain all of the equipment types described in the background section with regards to CTI-processors and servers, and other equipment types and capabilities known to exist in state-of-the-art communication centers. Such equipment types include but are not limited to Interactive Voice Response (IVR) units, automated fax systems, Customer Information Systems (CIS), IP data routers, e-mail routing systems, and so on.

In this example, center 4011 is defined as a source center that distributes object-oriented CTI scripts to centers 4012 and 4013, and by inference to many other centers as well. A central file/data server 4021 is illustrated as connected to backbone 4018 and participating in network 4009. Server 4021 is adapted as an XML server. Server 4021 contains XML representations of CTI scripts created within center 4011 and stores them for access by centers 4012 and 4013. Any of centers 4011-4013 may serve as an application source-center. The inventor chooses center 4011 for exemplary purpose only. Similarly, there may be many more than three communication centers connected to and participating in distribution network 4009 without departing from the spirit and scope of the present invention. However, all that is required to practice distribution in network 4009 is two communication centers.

In one embodiment, a distributing entity may not be an actual communication center practicing the art of CTI telephony. In these alternate cases, the distributing entity may instead be a dedicated application source, testing and distribution facility.

A knowledge center 4015 represents a remote testing facility having at least one manned workstation, illustrated in this example by a computer icon 19. Knowledge center 4015 is illustrated as connected to backbone 4018 by virtue of Internet connection as described with communication centers 4011-4013.

In one embodiment of the invention, knowledge center 4015 may be resident within and a functional part of one or all of communication centers 4011-4013. The purpose of center 4015 is to analyze communication-center scripts for accuracy and functionality within the scope of a dedicated testing facility. Center 4015 may have one workstation resident therein as is illustrated in this example, or it may have many resident workstations having similar capabilities. Only one workstation 4019 is illustrated in this example and deemed sufficient for teaching of the present invention. Knowledge center 15 may be assumed to be a third party as described in the background section.

Communication center 4011 comprises, among other utilities, a software suite 4017a, which is adapted for creating and implementing communication center functionality. A good example of an applicable software suite is the Nirvana™ suite mentioned in the background section and known to the inventor. Centers 4012 and 4013 utilize similar software suites for creating and implementing their own internal communication center functionality. These are represented as suites 4017b and 4017c respectively. It is important to note here that the functional CTI software and hardware exhibited by centers 401-403 does not have to be of the same manufacturer or provider. In fact, all three centers may use equipment types and software suites that, for general purposes, are foreign to one another in terms of interoperability. The term disparate as used earlier in this specification describes this arrangement.

It is a goal of the present invention is to facilitate interoperability between centers 4011-4013 with regard to distributed or shared CTI applications. For example, each provided software suite 4017a-4017c comprises an object-oriented-programming-system (OOPS). Each instance of OOPS may follow different rules and protocol than other illustrated instances. The basic function of each illustrated instance of OOPS is to provide a method for creating object-oriented CTI scripts for controlling communication center operations.

In order for communication centers 4011-4013 to share and distribute object-oriented CTI scripts with each other in current art, each illustrated instance of OOPS must be compatible with or supported by other instances in terms of rules and protocol. Similarly, objects defined by the OOPS in each system must be identical or within a supported range of objects allowed by a proprietary protocol. Moreover, a proprietary DL must be used to describe the objects for distribution purposes.

In this example, it is assumed that software and hardware configurations attributed to centers 4011-4013 are not identical. For example, objects created and defined by the OOPS of suite 4017a in center 4011 may not be identical in definition or available functionality as objects created and defined by the OOPS of suite 4017c in center 4013 and so on. Distributing functional CTI applications created, for example, in center 4011 to center 4013 would be extremely difficult in current art. A means of software and hardware integration would have to be provided for both systems to share and distribute CTI applications to each other. In some cases, hardware and operating systems may have to be modified to insure compatibility.

In order to achieve integration and compatibility between centers 4011-4013 without requiring substantial software and/or hardware modification, the inventor provides a unique connector (CONN.) described as an SEE extension that is adapted to read and write in XML. XML is a standard markup language developed by the World Wide Web Consortium (W3C). Much information regarding the XML standard is published and available to the skilled artisan.

One CONN. is illustrated in each suite 4017a, 4017b, and 4017c. A CONN. is further defined in this specification as interfacing extension or hardware-enabled driver that interfaces with a SEE generic to the OOPS utilized in each center.

For example, in center 4011, suite 4017*a* has an OOPS that defines and stores created objects during the process of creating new object-oriented CTI scripts. The CONN. in suite 4017*a* allows the parameters of these objects to be described in XML, which is a standard and platform-independent language known in the art and available to the inventor. CONN. instances in suite 4017*b* and in suite 4017*c* function likewise to interface with respective OOPS SEEs.

As per the above description, it can be seen now that each communication center 4011-4013 has the ability to convert object-oriented scripts into XML and upload the XML scripts onto network 4009 through backbone 4018, which is the Internet in this example. This process is entirely automated. As is known in the art, a document-type-definition (DTD) accompanies an XML file in transit over a DPN. A DTD describes how data is to be organized and presented or used on a receiving system. In this example, there is a controlling or source/distribution center described earlier in this specification as center 4011.

In order for center 4011 to provide object-oriented scripts to function in centers 4012 or 4013, it only has to have knowledge of the objects specific to each receiving center as defined by existing instances of OOPS at each center. Therefore, as an application creator and distributor, center 4011 creates a DTD that contains all of its objects, all of the objects of center 4012, and all of the objects of center 4013. In this way, a universal DTD exists that provides instruction for application generation at the receiving end that is suitable with the platform used at the receiving end. It is noted herein that a distributing center may create an application and distribute it directly to a target center connected to network 4009. However, in this example, it is preferred that server 4021 manages distribution of the XML scripts to centers 4012 and 4013, and to other connected centers not shown.

In practice of the present invention, assume that center 4011 hosts center 4012 and center 4013. In this case, center 4011 will provide CTI scripts for application at centers 4012 and 4013. It is assumed in this case that all three centers have differing OOPS protocols, and defined objects as described above. Center 4011 first creates a DTD containing its own objects as well as the objects available in the OOPS of center 4012 and center 403. Center 4011 can now create an object-oriented CTI application using its own OOPS and convert it to XML by virtue of its CONN. using the universal DTD containing the objects of centers 4012 and 4013 as a subset. The XML script created is a text or "flat file" that does not contain memory objects and is therefore platform independent. The XML script is uploaded into server 4021 from whence it can be accessed by centers 4012 and 4013, and by station 4015.

Suites 4017*b* and 4017*a* read the XML script by virtue of CONN. instances and generate the CTI application using the accompanying DTD, which contains their system-specific objects. As a result, center 4012 and center 4013 may generate the CTI application from XML script, each using their own OOPS for implementation in their respective environments.

System center 4015 may be utilized for analyzing and testing CTI scripts from server 4021 before they are made available to designated centers, or at other times as well. In this regard, center 4015 would have an OOPS simulation and modeling system, a SEE and a CONN. (components not shown). As previously described, center 4015 may be incorporated as an internal-applications testing facility inside one or all of centers 4011-4013. In this embodiment, center 4015 functions from a remote location and may intercept and perform third party analysis of scripts destined to any receiving center.

One with skill in the art of Petri-Net theory and application, and XML representation of objects will appreciate that virtually any type of object-oriented CTI script may be expressed as a form of XML for transportation over a DPN. XML versions of distributed scripts may be interpreted according to appropriate DTD parameters. At receiving centers, the CTI applications may be generated from XML description to produce object-oriented applications that are ready for installation using OOPS generic to the receiving center. Also, the method and apparatus of the present invention may be practiced with virtually any existing OOPS system and is not limited to Nirvana™ script.

Figure 14:
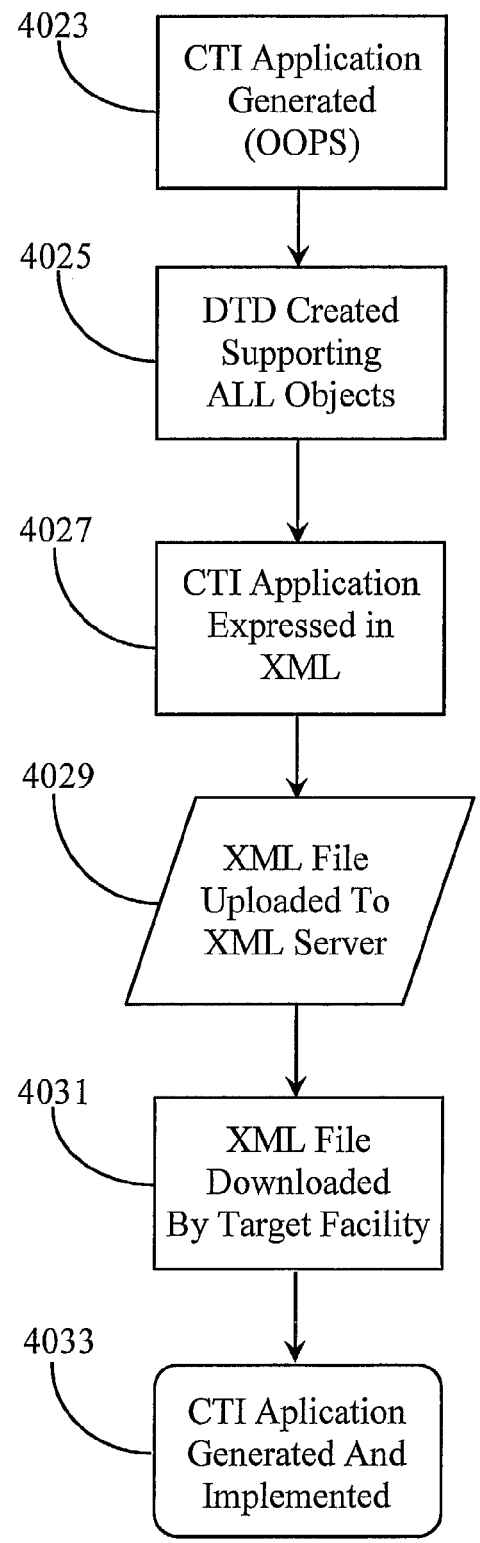
FIG. 14 is a flow diagram illustrating steps for generation and distribution of scripts according to an embodiment of the present invention.

FIG. 14 is a flow diagram illustrating steps for generation and distribution of object-oriented scripts according to an embodiment of the present invention. In step 4023, an object-oriented CTI application is generated at a source facility using a generic OOPS. A DTD is then created that contains all of the object parameters specific to the application and defined by the OOPS in step 4025. Also included in the DTD of step 4025 are the appropriate object parameters of equivalent objects defined by OOPS within receiving facilities that will receive and generate the created CTI application.

It is important to note here that an object-oriented CTI application may comprise only one script, or a plurality of separate scripts designed to perform as one routine. Therefore, a DTD may contain only those object parameters required to execute a routine. In another embodiment, a universal DTD may be created that contains all of the object parameters of the creating facility as well as all of the object parameters of the receiving facility or facilities. In this way one universal DTD may be used for separate CTI applications.

In step 4027, the created CTI application is written as an XML "flat file" at the creating facility by virtue of a CONN. described in FIG. 13. The XML contains all of the description required for successful implementation at a receiving facility with the DTD providing appropriate object parameters.

In step 4029 the XML file representing the created CTI application is uploaded to a WAN-connected server, which is analogous to XML server 4021 of FIG. 13, and made available to a target facility or facilities. The term facility as used in this example is analogous to communication center as used in FIG. 13. However, a source facility may or may not be an actual communication center.

In step 4031, the XML file representing the created CTI application is downloaded from the WAN-connected server by a target facility. In one embodiment, XML files representing created CTI applications may be distributed directly to target facilities. However, because one application may be used in a plurality of disparate facilities, it is preferred that such facilities "pull" their files from a central location on the network.

At step 4033, the XML file representing the created application is read by virtue of a CONN. in a target facility and an object-oriented CTI application is generated and installed by an existing OOPS using the XML instruction and associated DTD guidelines for appropriate objects.

It will be apparent to one with skill in the art that the process flow represented herein comprises basic steps and should be considered exemplary only of a basic order of steps involved in application creation, XML expression, XML interpretation, and generation of the application at the receiving end based on XML instruction. In one embodiment, additional steps may be inserted to allow for third party testing of a generated CTI application before implementation within a target facility.

In still another embodiment, it is possible that a CTI application may be created that includes DNT functionality such that there is a CTI implementation and a DNT implementation for the routine or string of routines characterized by the application. If a receiving facility is a CTI-only center then it may ignore the DNT version of the application. If the receiving center is a DNT only center, then it may ignore the CTI version of the application. If the receiving facility is a dual capable facility, then it may incorporate both versions of the application.

The method and apparatus of the present invention allows one object-oriented CTI application to be sent to and utilized by a plurality of disparate communication centers without requiring special hardware, software, or a proprietary DL. All that is required of each participating facility is that their OOPS objects be defined and included in a DTD at the source, and that they are capable of receiving and interpreting XML and using the information in their OOPS for generating object-oriented application.

It will also be apparent to one with skill in the art that an application creating facility may be created that provides CTI solutions to clients defined as the receiving facilities connected to network 9. In this case, the source facility would design solutions, test them for operability and integrity, and distribute them to clients as needed. There are many possibilities. Therefore, the spirit and scope of the present invention should be afforded the broadest scope under examination. The spirit and scope of the present invention is limited only by the claims.

THE SPIRIT AND SCOPE OF THE INVENTION

It will be apparent to those with skill in the art that there are many alterations that may be made in the embodiments of the invention herein described without departing from the spirit and scope of the invention. Many individual hardware elements in the invention as described in embodiments above are well-known processors and data links. The connectivity, however, of many of these elements is unique to embodiments of the present invention. Moreover, many of the functional units of the system in embodiments of the invention may be implemented as code routines in more-or-less conventional computerized telephony equipment and computer servers. It is well-known that programmers are highly individualistic, and may implement similar functionality by considerably different routines, so there will be a broad variety of ways in code that unique elements of the invention may be implemented. Also, the invention may be applied to widely varying hardware and software systems, and to both conventional telephony calls, or to Internet protocol calls, or to calls made by data mechanisms in any data environment, be it Internet, Intranet, or other. Further, the links between processors running T-Servers at the call center level and processors running T-Servers at the network level may be done in a variety of ways as well to the associated equipment may be done in a number of ways, and there is a broad variety of equipment that might be adapted to provide the servers 223 and 224, and other such servers associated with call centers. There are similarly many other alterations inn the embodiments described herein which will fall within the spirit and scope of the present invention in its several aspects described. The invention is limited only by the breadth of the claims below.

What is claimed is:

1. A network-centric call-processing system receiving Internet Protocol Network Telephony (IPNT) calls, the system including a processor routing the received IPNT calls to addresses selected by the processor based on information about availability of a person at the address to take a call, and about one or both of presence of specific hardware or software capability at the address, or specific authorization of a person at the address to handle certain calls, the information received from persons or equipment at the addresses.

2. The system of claim 1 wherein the persons at individual ones of the addresses are agents of a single enterprise operating in a call center.

3. The system of claim 1 wherein the persons at individual ones of the addresses are agents of a single enterprise distributed over two or more call centers.

4. The system of claim 1 wherein the persons at individual ones of the addresses are agents of a single enterprise operating individually as remote agents separately connected to the network.

5. The system of claim 1 wherein a requirement for status, activity or skill level is provided by a caller associated with a specific received IPNT call.

6. The system of claim 1 further comprising a facility at the call processing system in the network for taking back and re-routing previously-routed calls.

7. A method for routing Internet Protocol Network Telephony IPNT (IPNT) calls, comprising steps of:
   (a) establishing a network-centric call-processing system receiving IPNT calls; and
   (b) routing the received IPNT calls to addresses selected by the processor based on information about availability of a person at the address to take a call, and about one or both of presence of specific hardware or software capability at the address, or specific authorization of a person at the address to handle certain calls, the information received from persons or equipment at the addresses.

8. The method of claim 7 wherein the persons at the addresses are agents of a single enterprise operating in a call center.

9. The method of claim 7 wherein the persons at the addresses are agents of a single enterprise distributed over two or more call centers.

10. The method of claim 7 wherein the persons at the addresses are agents of a single enterprise operating individually as remote agents separately connected to the network.

11. The method of claim 7 wherein a requirement for status, activity or skill level to route a call is provided by a caller associated with a specific received IPNT call.

12. The method of claim 7 further comprising a facility at the call processing system in the network for taking back and re-routing once-routed calls.

* * * * *